United States Patent
Takahashi et al.

(10) Patent No.: US 6,977,941 B2
(45) Date of Patent: Dec. 20, 2005

(54) SHARED BUFFER TYPE VARIABLE LENGTH PACKET SWITCH

(75) Inventors: Masami Takahashi, Yokohama (JP);
Akio Makimoto, Yokohama (JP);
Takahiko Kozaki, Tokyo (JP);
Takayuki Kanno, Yokohama (JP);
Yasuo Oginuma, Yokohama (JP);
Kaori Nakayama, Yokohama (JP);
Mitsuhiro Wada, Yokohama (JP);
Norihiko Moriwaki, Kokubunji (JP);
Masumi Fukano, Yokohama (JP);
Yusho Futami, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 536 days.

(21) Appl. No.: 09/791,791

(22) Filed: Feb. 26, 2001

(65) Prior Publication Data

US 2002/0054602 A1   May 9, 2002

(51) Int. Cl.[7] .......................... G06F 12/00; H04L 12/56
(52) U.S. Cl. ................. 370/412; 370/395.72; 370/428; 711/153; 710/56
(58) Field of Search ............................. 370/412, 413, 370/395.52, 428, 395.72; 711/153; 710/52, 710/53, 54, 55, 56

(56) References Cited

U.S. PATENT DOCUMENTS

| | | | |
|---|---|---|---|
| 5,893,162 A * | 4/1999 | Lau et al. ................ | 711/153 |
| 6,487,202 B1 * | 11/2002 | Klausmeier et al. ..... | 370/395.1 |
| 6,611,527 B1 * | 8/2003 | Moriwaki et al. ........ | 370/412 |
| 6,694,388 B1 * | 2/2004 | Schzukin et al. ......... | 710/52 |
| 6,735,207 B1 * | 5/2004 | Prasad et al. ............ | 370/395.7 |

OTHER PUBLICATIONS

"A 50-Gb/s IP Router" Craig Partridge et al. IEEE/ACM Transaction on Networking, vol. 6, NO Jun. 3, 1998.*
C. Partridge, "A 50-Gbsemiconductor IP Router", IEEE/AGM Transactions on Networking, vol. 6, No. 3, Jun. 1998, pp. 237.

* cited by examiner

*Primary Examiner*—Afsar Qureshi
(74) *Attorney, Agent, or Firm*—Mattingly Stanger Malur & Brundidge P.C.

(57) ABSTRACT

A packet switch having a structure of writing a variable length packet received from each of input lines into a shared buffer memory on a fixed length data block unit basis, wherein a buffer controller forms an input queue for each input line and, when the last data block of a variable length packet is registered in the input queue, links a linked address list for the input queue to one or a plurality of output queues corresponding to one or a plurality of packet destination output lines.

16 Claims, 17 Drawing Sheets

SHARED BUFFER TYPE VARIABLE LENGTH PACKET SWITCH

BACKGROUND OF THE INVENTION (1) Field of the Invention

The present invention relates to a packet switch applied as a node apparatus in a variable length packet communication network and, more particularly, a shared buffer type variable length packet switch using a shared buffer memory as a memory for temporarily storing received packets.

(2) Description of the Related Art

In recent years, in the Internet protocol (IP) to which attention is paid, a message is transferred by using a variable length packet (IP packet) called IP datagram as a transfer unit. In a conventional node apparatus as an element of an IP packet network, received packets are switched to a destination path by a software process. To address a demand on higher speed of switching, a node apparatus for switching a packet by using a fixed length packet (data block) as a transfer unit has been proposed.

As a node apparatus for transferring IP packets at high speed, for example, the paper of "A 50-Gb/s IP Router", Craig Partridge et al., IEEE/ACM TRANSACTIONS ON NETWORKING, Vol. 6, No. 3, June 1998 discloses a router having the configuration in which a plurality of line cards (line boards) for supporting a plurality of network interfaces and a forwarding engine card having a routing table are coupled to each other via, for example, a point-to-point type switch typified by a crossbar switch. Each of the line cards transmits a data block including a header of a received packet to the forwarding engine. A data block including new header information updated by the forwarding engine is returned to the line card on the packet input side. Each of the line cards on the input side forwards the data block including the new header information and the rest of the packet toga line card on the output side.

The paper discloses that each of the line cards on the input side decomposes a packet to linked pages (data blocks) of a 64-byte unit and transmits the pages, and each of the line cards on the output side assembles the received pages to a linked list indicative of a packet and transfers the assembled packet to a QoS processor. The QoS processor places the packet in a proper position in a transmission queue on the basis of the packet length, destination, and a flow identifier designated by the forwarding engine.

One of switches for forwarding received packets in a fixed length packet unit is an ATM (Asynchronous Transfer Mode) switch. In the ATM switch, a fixed length packet (ATM cell) of 53 bytes received from each of input lines is temporarily stored in a buffer memory, and the stored cell is routed to a specific output line determined by a connection identifier (VPI/VCI) included in the cell header. When the ATM switch adopts a shared buffer type structure in which a buffer memory is shared by a plurality of input lines, it is able to form a variable length queue for each of output lines in the buffer memory. Therefore, for example, even when cell trains heading for the same output line are simultaneously received from a plurality of input lines, as far as there is an available space in the shared buffer as a whole, received cells from the input lines can be buffered without discarding a part of them. A switch effectively using the memory resource can be therefore realized.

Japanese Unexamined Patent Application No. 11-261584 discloses a switch for a variable length message, which utilizes the advantages of the shared buffer memory. In the Prior technique, the shared buffer memory is divided into a plurality of memory blocks corresponding to messages in advance, and one available memory block is assigned to each of the received messages. Each message received from each input line is divided into a plurality of fixed length cells, and a group of cells belonging to the same message are sequentially stored in the same memory block.

SUMMARY OF THE INVENTION

In the router described in the IEEE literature, a line card on the input side sends an inquiry to a line card on the output side via a switch allocator prior to transmission of a packet, and transmission of the packets is started when the line card on the output side accepts to receive the packet. There is consequently a problem that the packet switching speed is low. Furthermore, since each of the line cards on the input side needs a buffer for temporarily storing the packets, and each of the line cards on the output side also needs a buffer for composing a packet, there is a problem that the use efficiency of the buffer memories is low.

On the other hand, the switch described in Japanese Unexamined Patent Application No. 11-261584 is configured to transfer all of cells stored in a memory block corresponding to a received message to another memory area (message queue) when the tail portion of the message is received. The switch therefore requires time to forward a message between the memory areas and has a problem in the use efficiency of the buffer memory.

An object of the invention is to provide a packet switch capable of switching a variable length packet at high speed by efficiently using a shared buffer memory.

Another object of the invention is to provide a packet switch capable of multi-casting a variable length packet by efficiently using a shared buffer memory.

In order to achieve the objects, a packet switch of the invention comprises: a shared buffer memory commonly used by a plurality of input lines; multiplexing means for multiplexing the received packets from the input lines on the fixed length data block unit basis and supplying the fixed length data blocks to the shared buffer memory; and buffer control means for controlling writing and reading out of each of the fixed length data blocks to and from the shared buffer memory. The buffer control means forms input queues corresponding to variable length packets when fixed length data blocks output from the multiplexing means are written into the shared buffer memory. When the last data block of a variable length packet is registered in one of input queues, the buffer control means links the input queue to an output queue corresponding to a destination output line of the variable length packet.

More specifically, the buffer control means comprises: first control means for forming a plurality of input queues corresponding to variable length packets by linking write addresses of fixed length data blocks, and for linking an input queue of which the last fixed length data block of a variable length packet is already written to said shared buffer memory to an output queue corresponding to a destination output line of the variable length packet; and second control means for accessing a plurality of output queues, each of which is corresponding to output lines, in accordance with a predetermined order and reading out fixed length data blocks from the shared buffer memory on the basis of linked addresses associated with said output queues. The input queue for each of the variable length packet is formed by, for example, writing a fixed length data block into said shared buffer memory on the basis of a write address obtained from an idle address memory, and storing in a next address memory in correspondence with the write address, a write address to be used to write the next fixed length data block of the same variable length packet.

In the invention, each output queue takes the form of an address table for storing therein a next read address and a last read address indicative of the next data block and the last data block to be sent out to the destination output line. The first control means sets a write address of a head data block and a write address of a last data block of each variable length packet as said next read address and last read address into said address table corresponding to the destination output line, respectively, thereby completing the link of the input queue to the output queue. In this case, the second control means reads out a fixed length data block and the addresses of a next fixed length data block from said shared buffer memory and next address memory, respectively, on the basis of the next read address registered in each of the output queues, sets the address read out from said next address memory as a new next read address in the output queue, thereby enabling data blocks constructing a variable length packet to be sequentially read out.

In the case of linking an input queue of a succeeding variable length packet to an output queue being in a state where the last read address of a preceding variable length packet is already registered, said first control means links within the next address memory a write address of a head data block of the succeeding variable length packet to the last read address of the preceding variable length packet.

According to the second embodiment of the invention, the buffer control means comprises: first control means for forming a plurality of input queues corresponding to variable length packets by linking write addresses of fixed length data blocks, and for linking an input queue, of which the last fixed length data block of a variable length packet is already written into said shared buffer memory, to an output queue corresponding to a destination output line of said variable length packet, said output queue having a standby buffer; and second control means for accessing a plurality of output queues formed so as to correspond to output lines, in accordance with a predetermined order and reading out fixed length data blocks from said shared buffer memory on the basis of linked addresses associated with said output queues.

In the second embodiment, each of said output queue is constructed by, for example, a standby buffer for temporarily storing therein write addresses of a head data block and the last data block of a variable length packet, and an address memory for storing therein a next read address and a last read address indicative of the next data block and the last data block. The first control means registers a write address of a head data block and a write address of a last data block of a variable length packet into said standby buffer corresponding to the destination output line. When the address memory associated with the standby buffer enters an idle state, said second control means sets a pair of write addresses obtained from the standby buffer into the address memory as a next read address and a last read address of a new data block group. In this case, the second control means reads out a fixed length data block and the address of a next fixed length data block from said shared buffer memory and said next address memory, respectively, on the basis of a next read address registered in each of the output queues, and sets the address read out from said next address memory as a new next read address in the output queue, thereby enabling data blocks constructing a variable length packet to be sequentially read out.

In the case where a received packet is a multi-cast packet, by registering the same input queue into a plurality of output queues corresponding to multi-cast output lines by the first control means when the last data block of the multi-cast packet is written in the shared buffer memory, multi-cast forwarding can be realized. In this case, by providing a packet switch with address release control means for counting the number of reading times of a fixed length data block in the shared buffer memory and, when the number of reading times reaches a designated value, releasing the next read address, an idle address in the shared buffer memory can be managed.

DESCRIPTION OF THE PREFERRED EMBODIMENTS

Embodiments of the invention will be described in detail hereinbelow with reference to the drawings.

Figure 1:
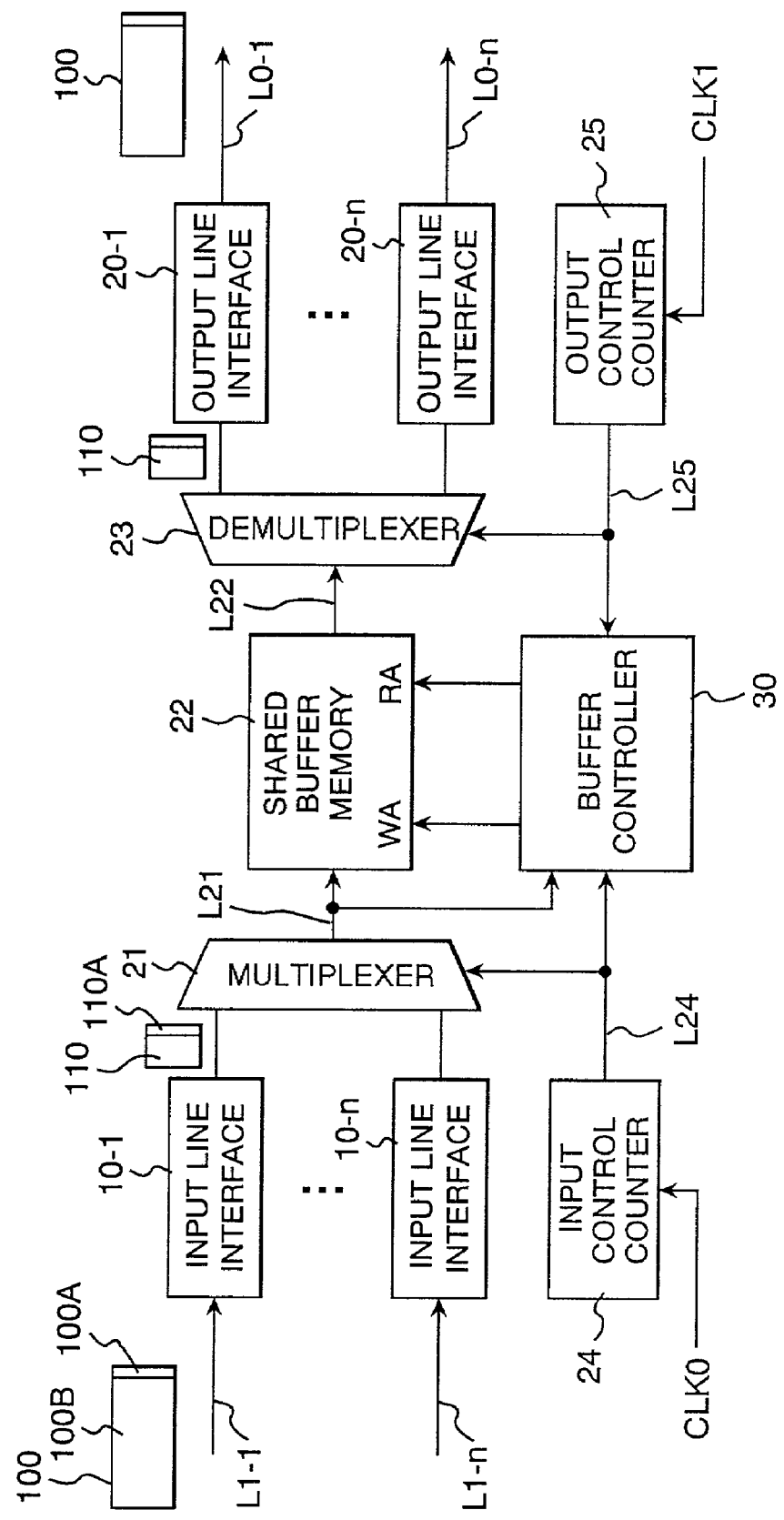
FIG. 1 is a diagram showing a packet switch according to a first embodiment of the invention.

FIG. 1 is a block diagram showing a packet switch according to an embodiment of the invention. A packet switch 1 has: a plurality of input line interfaces 10-1 to 10-n each for dividing a variable length packet 100 supplied from each of input lines LI-1 to LI-n into a plurality of fixed length data blocks 110, adding an internal header 110A to each data block, and outputting the resultant data block; a multiplexer 21 for time-division multiplexing the data block received from the input line interfaces 10-1 to 10-n and outputting the datablocks to a signal line L21; a shared buffer memory 22 connected to the signal line L21; a demultiplexer 23 for sequentially distributing the data blocks read out from the shared buffer memory 22 to a signal line L22 to a plurality of output line interfaces 20-1 to 20-n; a buffer controller 30 for controlling the writing and reading of the data block to and from the shared buffer memory 22; an input control counter 24 for counting a clock CLK0 indicative of a writing cycle and generating an input line selection signal; and an output counter 25 for counting a clock CLK1 indicative of a reading cycle and generating an output line selection signal.

A variable length packet supplied from each input line LI=i (i=1 to n) is comprised of a packet header 100A including a destination address and a data portion 100B. Each of the input line interfaces 10-i (i=1 to n) divides the variable length packet 100 received from the input line LI-i into a plurality of fixed length data blocks 110, generates an internal header 110A including, for example, input line number, output line number determined by the destination address extracted from the packet header 100A, and block position indicating information indicating that each data block 110 corresponds any of a first block, an intermediate or middle block, and a last block in the variable length packet, adds the internal header 110A to each data block, and outputs the resultant data block.

The data block is written to and read out from the shared buffer memory 22 alternately in accordance with the clocks CLK0 and CLK1. The multiplexer 21 circulatingly selects the input line interfaces 10-1 to 10-n in accordance with the input line selection signal generated on the signal line L24 by the input control counter 24, and sequentially multiplexes the data blocks 110 output from the input line interfaces onto the signal line L21.

On the other hand, the demultiplexer 23 distributes the data blocks read out from the shared buffer memory 22 to the signal line L22, to the output line interfaces 20-j (j=1 to n) specified by the output line selection signal generated on a signal line L25 by the output counter 25. Each of the output line interfaces 20-1 to 20-n eliminates the internal header 110A from the data block 110 received from the demultiplexer 23 and outputs the resultant data block to the corresponding one of the output lines LO-1 to LO-n.

The buffer controller 30 writes the data block into the shared buffer memory 22 while forming a linked address list corresponding to input line number (i) indicated by the internal header 110A appearing on the signal line L21 in each writing cycle indicated by the clock CLK0. As will be described hereinafter, the buffer controller 30 forms a new input queue corresponding to the input line each time the first block of the received packet appears on the signal line L21, sequentially registering the data in the following intermediate and last blocks to the input queue corresponding to the input line, and dynamically controls the linked address list so as to link the input queue to an output queue corresponding to a output line as a destination of the received packet at the time point when the last block of the received packet is written into the shared buffer memory 22.

An operation of reading out the data blocks from the shared buffer memory 22 is performed on the basis of the output queue address list formed in correspondence with each output line. The buffer controller 30 checks the presence or absence of a data block to be read out with respect to an output queue corresponding to an output line selection signal supplied via the signal line L25. If the data block address has been linked to the output queue, one of data blocks is read out from the shared buffer memory 22 to the signal line L22 by using the next read address registered in the output queue address list as a read address RA, and the next read address in the address list is updated to the next data block address in the linked address list.

Figure 2:
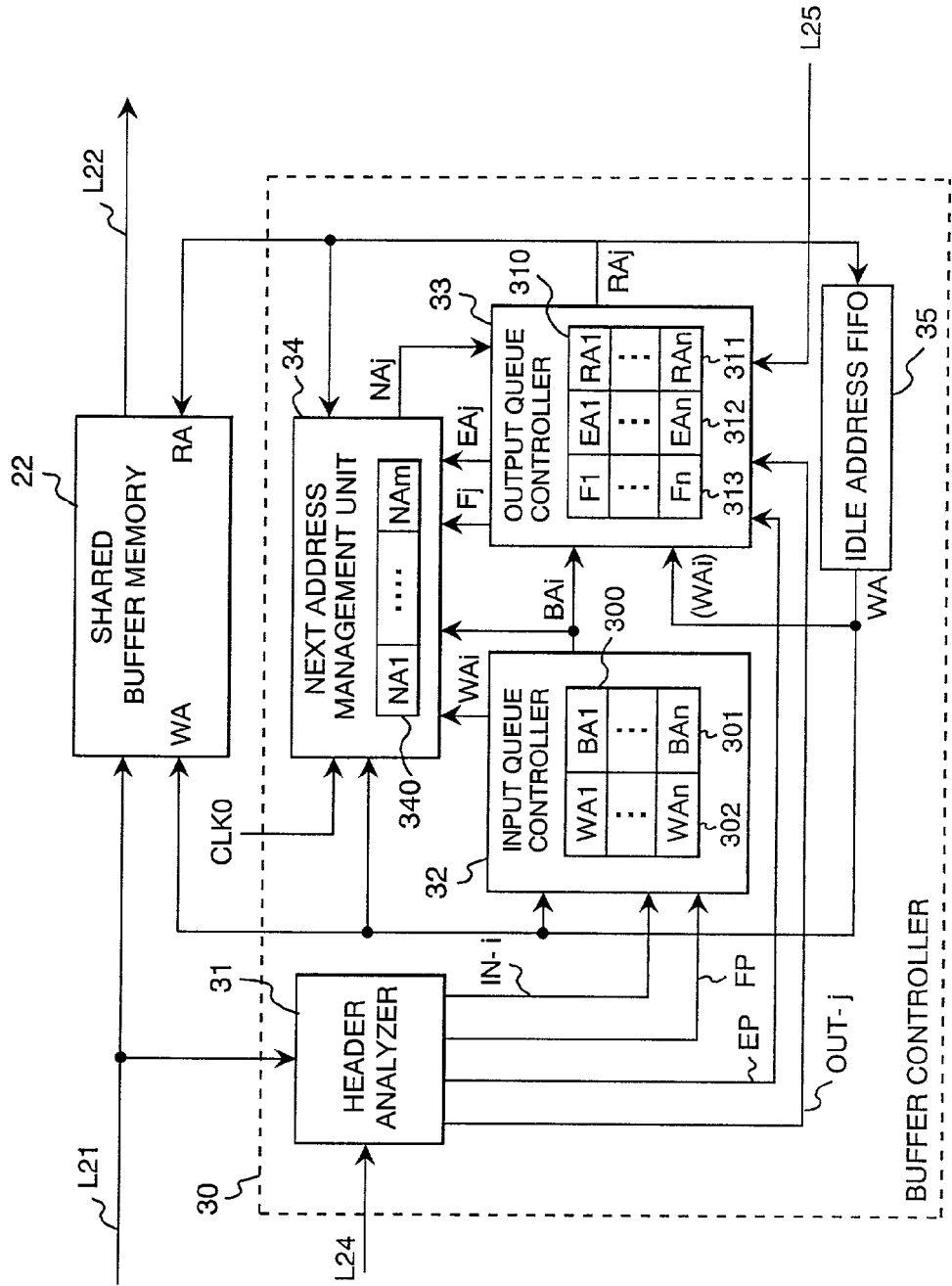
FIG. 2 is a diagram showing a first embodiment of a buffer controller 30 in the packet switch illustrated in FIG. 1.

FIG. 2 is a block diagram showing a first embodiment of the buffer controller 30. The buffer controller 30 includes a header analyzer 31, an input queue controller 32, an output queue controller 33, a next address management unit 34, and an idle address memory (FIFO) 35 for storing idle addresses of the shared buffer memory 22.

The header analyzer 31 analyzes the internal header of each data block appearing on the signal line L21 and generates input line number IN-i, output line number OUT-j, a head indication flag signal FP indicating whether the input data block is the first block of the received packet or not, and a tail indication flag signal EP indicating whether the input data block is the last block of the received packet or not.

The input queue controller 32 has an input queue address table 300 showing, for each input line, an address 301 (packet head address BAi (i=1 to n)) of the first data block registered in the input queue and an address 302 of the latest data block (latest address WAi (i=1 to n)) registered in the input queue.

The output queue controller 33 has an output queue address table 310 indicating, for each output line: a read address (next read address RAj (j=1 to n)) 311 of a data block located at the head of an output queue; a read address (last read address EAj (j=1 to n)) 312 of a data block located at the end of the output queue; and a queue flag (Fj (j=1 to n)) 313 indicative of the presence or absence of registered data in the output queue.

The next address management unit 34 has a next address memory 340 comprising of a plurality of address storage areas NA1 to NAm of the number equal to the number "m" of data blocks which can be stored in the shared buffer memory 22. The storage areas of the next address memory 340 are used to form a plurality of linked address lists each for reading out data blocks registered in an input queue in accordance with a registration order.

Assuming now that variable length packets heading for the same output line LO-3 are received from the input lines LI-1 and LI-2, the function of the buffer controller 30 will be described in detail with reference to FIGS. 2 to 5, while paying attention to the packet head address BA1 and latest address WA1 of an input queue corresponding to the input line LI-1, the packet head address BA2 and latest address WA2 of an input queue corresponding to the input line LI-2, the queue flag F3, next read address RA3, and last read address EA3 of an output queue corresponding to the output line LO-3.

The header analyzer 31 analyzes the internal header 110A of each data block output to the signal line L21, and generates input line number IN-i and output line number OUT-i. When the data block is the first block of a variable length packet, the head indication flag signal FP is turned on. When the data block is the last block, the tail indication flag signal EP is turned on.

The data block output to the signal line L21 is written into the shared buffer memory 22 by using an idle address obtained from the idle address FIFO 35 as a write address WA. At this time, the input queue controller 32 updates the input queue address table 300 in accordance with the input line number IN-i output from the header analyzer 31 and the state of the head indication flag signal FP.

When the head indication flag signal FP is in the "on" state (at high level), the write address WA obtained from the idle address FIFO 35 is written as the packet head address BAi and the latest address WAi in the table entry corresponding to the input line number IN-i. When the head indication flag signal FP is in the "off" state (at low level), the write address WA is written as the latest address WAi. When the new address WA is written in the input queue address table 300, an address stored until then as the latest address WAi is output to the next address management unit 34. The next address management unit 34 stores the new write address WA obtained from the idle address FIFO 35 into the storage area NAi corresponding to the address WAi. Each time a fixed length data block obtained by dividing a variable length packet is written into the shared buffer memory 22, the write address of the data block is stored in the next address memory 340, and the latest address WAi is updated. Finally, the packet head address BAi indicates the address of the first data block of the variable length packet, and the latest address WAi indicates the address of the last data block of the variable length packet.

Figure 3:
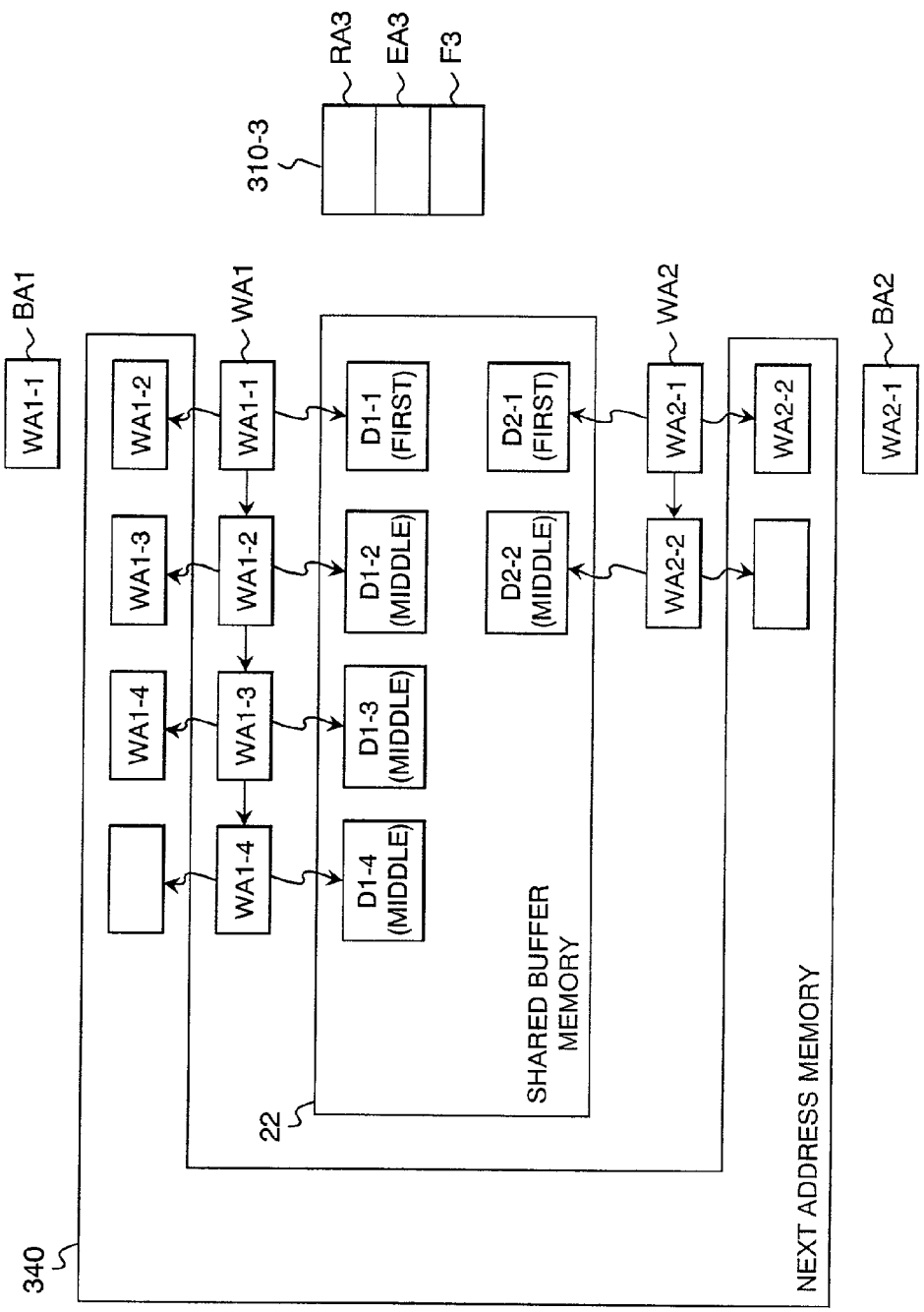
FIG. 3 is a diagram for explaining the states of data blocks stored in a shared buffer memory 22, and the contents of a next address memory 340 and an input queue address table 300 when controlled by the buffer controller 30 in the first embodiment.

FIG. 3 shows the state of the input queue address table 300 at the time point the data blocks D1-1 to D1-4 output from the input line interface 10-1 and the data blocks D2-1 and D2-2 output from the input line interface 10-2 are written into the shared buffer memory 22. WA1-1 to WA1-4 denote values of the write addresses WA of the data blocks D1-1 to D1-4 obtained from the idle address FIFO 35, and WA2-1 and WA2-2 denote values of the write addresses WA of the data blocks D2-1 and D2-2. RA3, EA3, and F3 indicate data of an output queue address table entry 310-3 corresponding to the destination output line LO-3 of the data blocks D1-1 to D1-4 and the data blocks D2-1 and D2-2.

In the input queue address table corresponding to the input line LI-1, the write address WA1-1 of the first data block D1-1 is stored as the packet head address BA1, and the data of the latest address WA1 is updated each time a data block is written and changes like WA1-1, WA1-2, WA1-3, and WA1-4.

In the next address memory 340, as shown in FIG. 3, the write addresses of the next data blocks are sequentially stored in a storage area corresponding to the latest address WA1, and a linked address list of each input line is formed by the packet head address BA1 in the input queue address 300 and the next address memory 340.

For example, by accessing the shared buffer memory 22 and the next address memory 340 on the basis of the address WA1-1 shown by the packet head address BA1, the first data block D1-1 and the address WA1-2 of the next data block D1-2 are read out. By using the address WA1-2 as the read address RA in the next reading cycle, the next data block D1-2 and the address WA1-3 of the further next datablock D1-3 are read out. By repeating operations as described above, all the data blocks registered in the input queue can be read out.

In a manner similar to the input line LI-1, in an input queue address table corresponding to the input line LI-2, the write address WA2-1 of the first data block D2-1 is stored as the packet head address BA2, and the data of the latest address WA1 is updated each time a data block is written and changes like WA2-1, WA2-2, . . . .

FIG. 3 shows a state before the input line interfaces 10-1 and 10-2 output the last data blocks of the variable length packets. There is no registered data in an output queue corresponding to the output line LO-3, and the output queue address table entry 310-3 is blank.

The present invention is characterized in that when the last data block in a packet is written in the shared buffer memory 22, the buffer controller 30 shifts the packet head address BAi and the latest address WAi (=WA) in the input queue of the last data block to the output queue address table 310. When a destination output queue of the data blocks stored in an input queue is in an idle state, that is, when a queue flag Fi corresponding to the output line number OUT-j output by the header analyzer 31 is "0", the contents of the packet head address BAi and the latest address WAi is transferred to the next read address RAj and the last read address EAj in the output queue address table entry 310-j, respectively, and the queue flag Fj is changed to "1".

Figure 4:
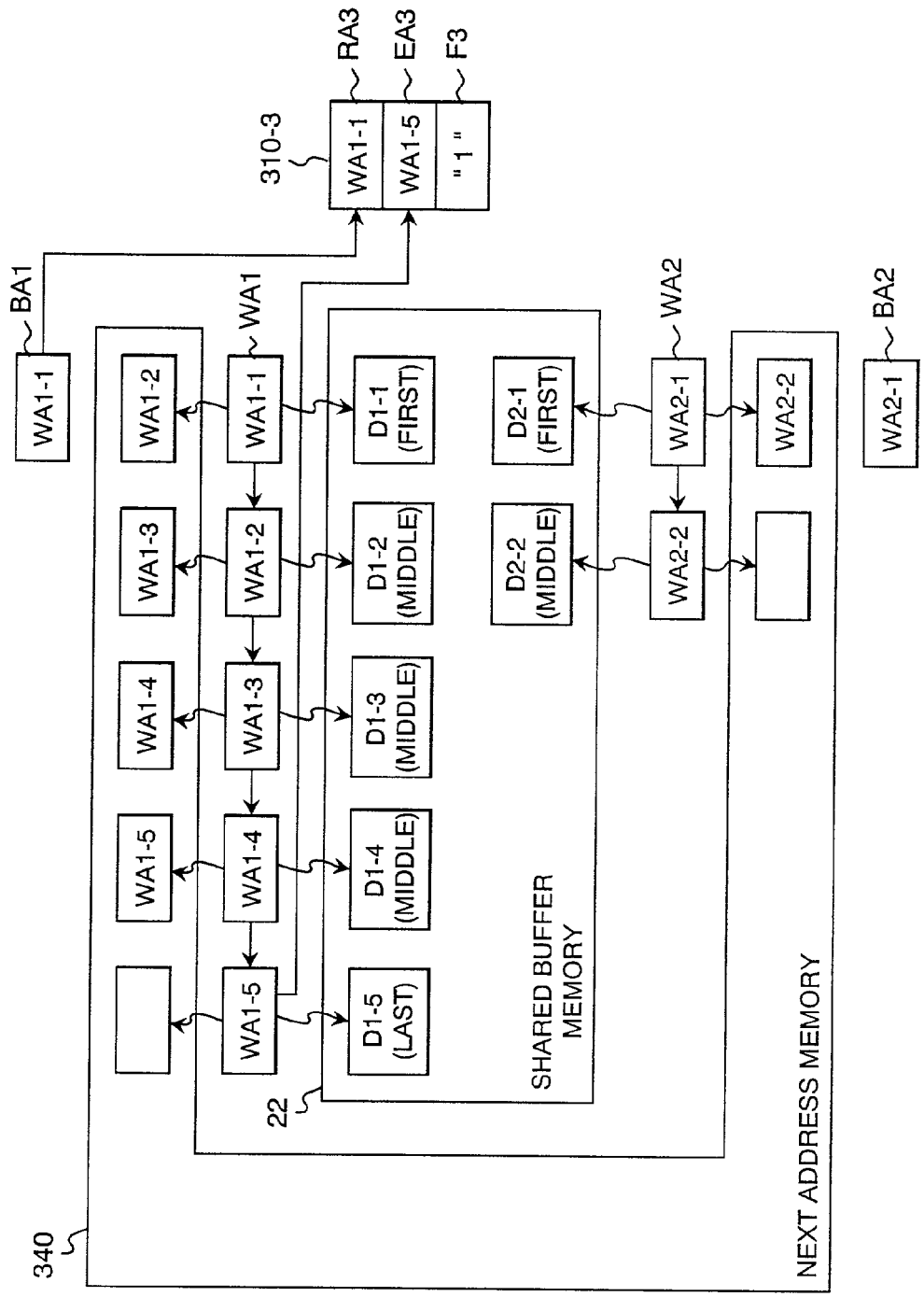
FIG. 4 is a diagram for explaining the relation between the input queue address table 300 and an output queue address table 310 when the last data block in a variable length packet arrives.

FIG. 4 shows operations of the buffer controller 30 at the time point when last data block D1-5 of the variable length packet output from the input line interface 10-1 is written into the shared buffer memory 22. In this case, the buffer controller 30 stores a write address WA1-5 of the last data block D1-5 into the next address memory 340, transfers the contents (WA1-1) of the packet head address BA1 and the contents (WA1-5) of the latest address WA1 in the input queue to RA3 and EA3 in the output queue address table, respectively, and changes the queue flag F3 to "1". Since the contents of the latest address WA1 is changed to the new write address WA obtained from the idle address FIFO 35 at this time, the write address WA obtained from the idle address FIFO 35 may be stored in EA3 in the output queue address table in place of the latest address WA1.

When the output queue as a destination of the data block stored in the input queue is in use, that is, the queue flag Fj corresponding to the output line number OUT-j output from the header analyzer 31 is in the "1" state, the buffer controller 30 couples the linked address list of the input queue with the linked address list of the destination output queue. The coupling of the linked address lists is achieved by storing the contents of the packet head address BAi of the input queue as a next address paired with the last data block of the output queue into the next address memory 340 and setting the contents of the latest address WAi of the input queue as the last read address EAj of the output queue address table 310.

Figure 5:
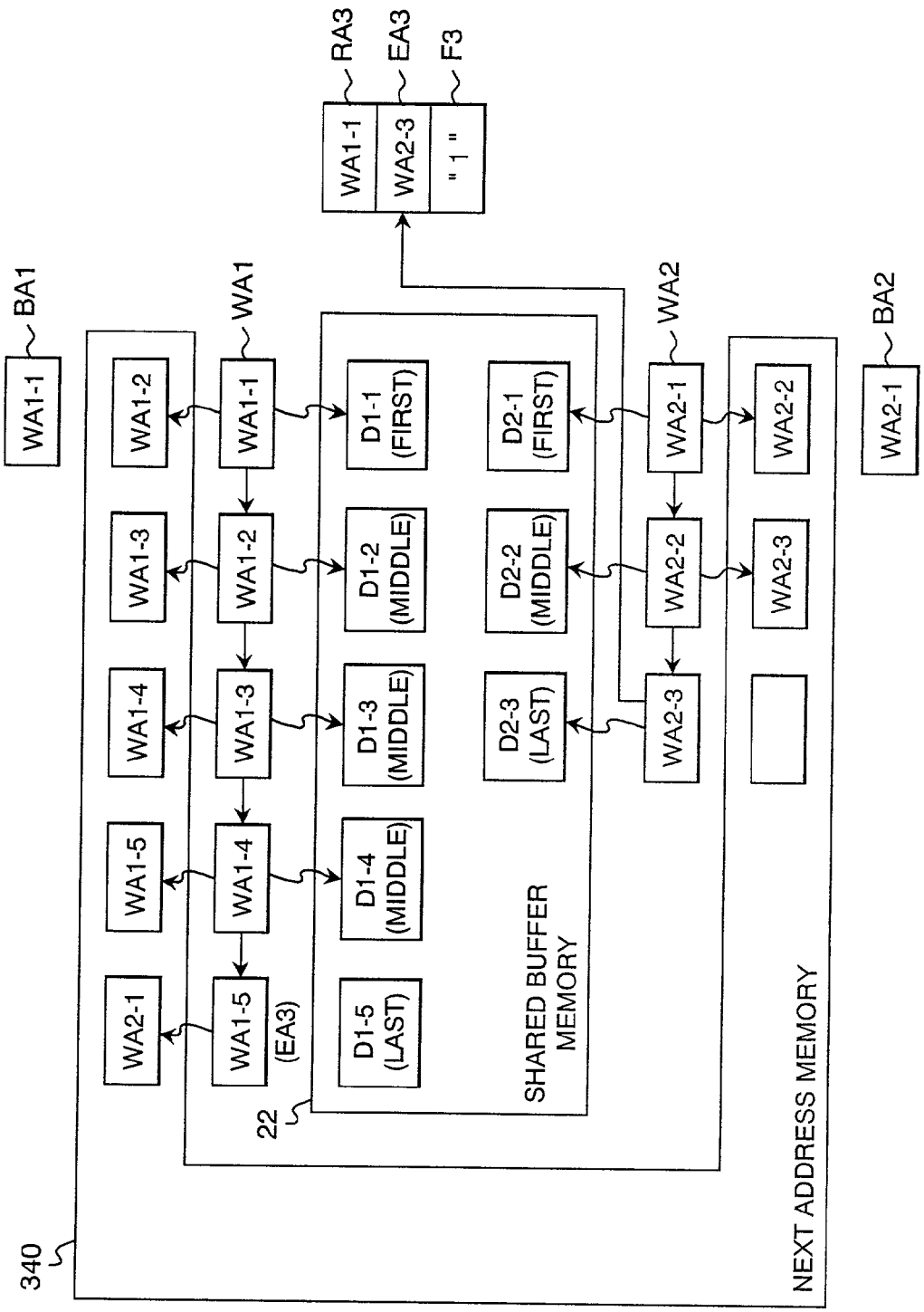
FIG. 5 is a diagram for explaining the relation between the input queue address table 300 and the output queue address table 310 when the last data block of another variable length packet arrives in a state where an output queue is in use.

FIG. 5 shows operations of the buffer controller 30 in the case of writing the last data block D2-3 of the variable length packet output from the input line interface 10-2 into the shared buffer memory 22 in a state where the output queue of the output line LO-3 is already in use. In this case, the buffer controller 30 stores a write address WA2-3 of the last data block D2-3 into the next address memory 340, and writes the contents (WA2-1) of the packet head address BA2 in the input queue as the next address paired with the last data block D1-5 which has been already registered in the output queue into the next address memory 340. The head address WA2-1 is written into the next address memory 340 by using the last read address WA1-5 (refer to FIG. 4) indicated by EA3 in the output queue address table at that time point as a write address. After that, EA3 in the output queue address is updated to the contents (WA2-3) of the latest address WA2.

When the variable length packet received by the line interface is so short as the entire received packets can be set within a fixed length data block, at the time of writing the data block into the shared buffer memory 22, the head indication flag signal FP and the tail indication flag signal EP output from the header analyzer 31 simultaneously turn on. In this case, in response to the head indication flag signal FP, the contents of the packet head address BAi and the latest address WAi registered in the input queue address table 300 are immediately transferred to the output queue address table 310 in response to the tail indication flag signal EP.

If the output queue of the output line LO-j as a destination of the data block is in an idle state, in a manner similar to FIG. 4, the contents of the packet head address BAi and the latest address WAi are written to RAj and EAj. When the output queue is already in use, in a manner similar to FIG. 5, the contents of the packet head address BAi is used as a next address which is paired with the last data block of the output queue, and the contents of the latest address WAi becomes new EAj.

Data blocks are read out from the shared buffer memory 22 by the out put queue controller 33. The output queue controller 33 refers to the output queue address table entry 310-j specified by an output line selection signal output to the signal line L25 in a reading cycle. When the queue flag Fj is "1", in accordance with the next read address RAj, the output queue controller 33 reads out a data block from the shared buffer memory 22, and reads out the next address NAj from the next address memory 340. The used next read address RAj is released to the idle address FIFO 35. The next address NAj read out from the next address memory 340 is stored as a new next read address RAj into the output queue address table.

Figure 6:
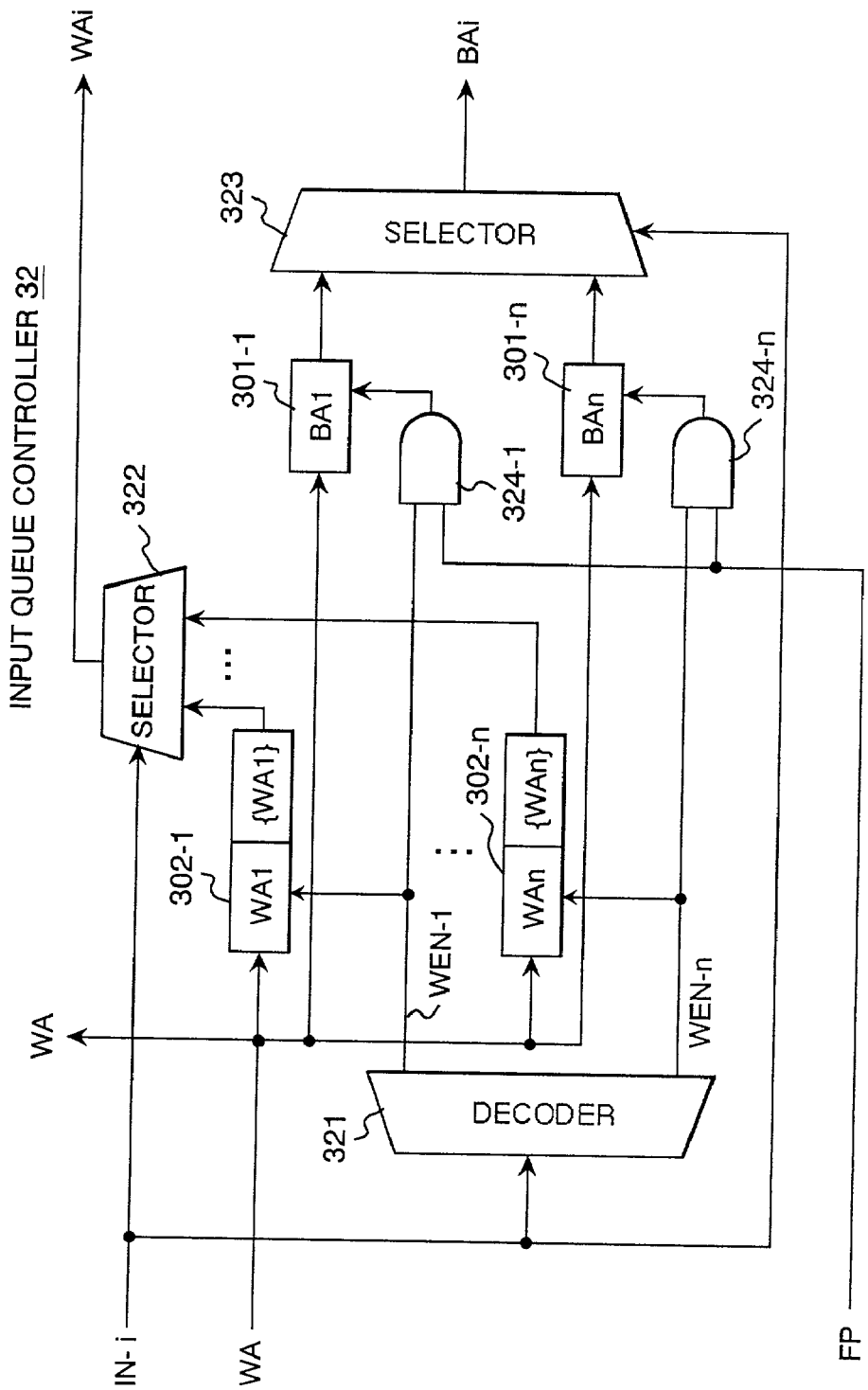
FIG. 6 shows an example of an input queue controller 32 illustrated in FIG. 2.

FIG. 6 shows an example of the input queue controller 32. The input queue controller 32 includes: registers 301-1 to 301-n for storing packet head addresses BA1 to BAn; registers 302-1 to 302-n for storing latest addresses WA1 to WAn; a decoder 321 for decoding an input line number IN-i received from the header analyzer 31 and setting one of enable signals WEN-1 to WEN-n into "on" state (at a high level); a selector 322 for selecting one of output addresses from the registers 302-1 to 302-n; a selector 323 for selecting one of output addresses from the registers 301-1 to 301-n; and AND circuits 324-1 to 324-n for controlling write enable signals of packet head addresses.

The address WA obtained from the idle address FIFO 35 is supplied to the registers 302-1 to 302-n for storing latest addresses. The enable signals WEN-1 to WEN-n output from the decoder 321 control updating of the latest address. When the input line number IN-i indicates the i-th input line, the enable signal WEN-i turns on, and the address WA obtained from the idle address FIFO 35 is set in the register 302-i. At this time, a write address {WAi} of the previous data block stored in the register 302-i until then is selected by the selector 322, and is supplied as an address WAi for writing the next address (pointer address) to the next address management unit 34.

The address WA obtained from the idle address FIFO 35 is also supplied to the registers 301-1 to 301-n for storing the packet head addresses BA1 to BAn. The writing operation to these registers is controlled by the AND circuits 324-1 to 324-n. Only in a writing cycle in which the head indication flag FP output from the header analyzer 31 is "on", the address WA is written into the register 301-i corresponding to the input line number IN-i. The selector 323 selects an output address from the register 301-i corresponding to the input line number IN-i and outputs the selected address as the packet head address BAi.

Figure 7:
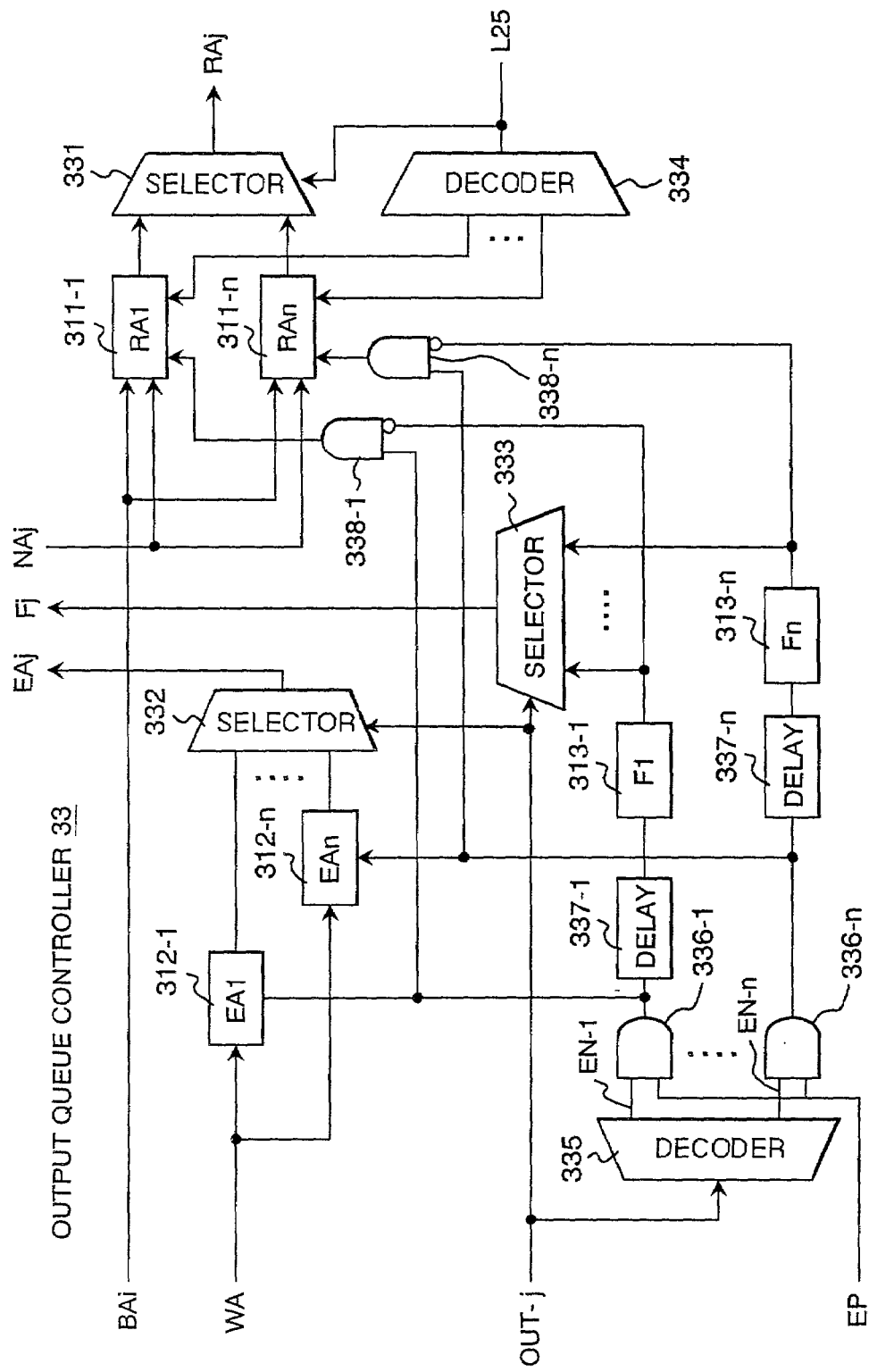
FIG. 7 shows an example of an output queue controller 33 illustrated in FIG. 2.

FIG. 7 shows an example of the output queue controller 33.

The output queue controller 33 includes: registers 311-1 to 311-n for storing next read addresses RA1 to RAn; registers 312-1 to 312-n for storing last read addresses EA1 to EAn; registers 313-1 to 313-n for storing queue flags F1 to Fn; a selector 331 for selecting one of output addresses from the registers 311-1 to 311-n; a selector 332 for selecting one of output addresses from the registers 312-1 to 312-n; a selector 333 for selecting one of output flags from the registers 313-1 to 313-n; a decoder 334 for decoding an output line selection signal output from the output counter 25 to the signal line L25; a decoder 335 for decoding the output line number OUT-j output from the header analyzer 31 and setting one of the enable signals EN-1 to EN-n into "on" state (high level); AND circuits 336-1 to 336-n for making the enable signals EN-1 to EN-n valid when the tail indication flag signal EP output from the header analyzer 31 is in the "on" state; delay circuits 337-1 to 337-n inserted between the AND circuits 336-1 to 336-n and the registers 313-1 to 313-n; and AND circuits 338-1 to 338-n inserted between the registers 313-1 to 313-n and the registers 311-1 to 311-n.

The write address WA obtained from the idle address FIFO 35 is supplied to the registers 312-1 to 312-n for storing the last read addresses EA1 to EAn, and a write enable signal is output from each of the AND circuits 336-1 to 336-n. When the tail indication flag signal EP is turned on, the write enable signal from the AND circuit 336-j corresponding to the output line number OUT-j becomes valid, and the write address WA is set in the register 312-j. The write address WA in this case is a write address WAi of the last data block of the variable length packet in the input queue address table 300. Consequently, the address WAi of the input queue is transferred to the last read address ENj of the output queue. Output lines of the registers 312-1 to 312-n are connected to the selector 332 to which the output line number OUT-j output from the header analyzer 31 is supplied as a selection signal. The output address EAj from the register 312-j designated by the output line number OUT-j is selected and supplied to the next address management unit 34.

Outputs of the AND circuits 336-1 to 336-n are supplied as setting signals to the registers 313-1 to 313-n for storing the queue flags F1 to Fn. Output lines of the registers 313-1 to 313-n are connected to the selector 333 to which the output line number OUT-j is supplied as a selection signal. The queue flag Fj of the register 313-j designated by the output line number OUT-j is selected and supplied to the next address management unit 34. Outputs of the AND circuits 336-1 to 336-n are supplied via the delay circuits 337-1 to 337-n to the registers 313-1 to 313-n. The queue flag Fj from the register 313-j selected by the selector 333 indicates the queue flag before being updated by the tail indication flag signal EP. After the queue flag Fj is output, a new queue flag is set in the register 313-j.

To the registers 311-1 to 311-n for storing the next read addresses RA1 to RAn, the packet head address BAi output from the input queue controller 32 and the next address NAi output from the next address management unit 34 are supplied. To the registers 311-1 to 311-n, output signals from the AND circuits 338-1 to 338-n are supplied as enable signals in the writing cycle, respectively. To the AND circuits 338-1 to 338-n, output signals of the AND circuits 336-1 to 336-n and inversed output signals of the registers 313-1 to 313-n are supplied. Under the condition that the queue flag signal Fj corresponding to the register 313-j designated by the output line number OUT-j is in the "off" state when the tail indication flag signal EP turns on, the packet head address BAi is stored in the register 311-j designated by the output line number OUT-j.

In the reading cycle, an enable signal is supplied from the decoder 334 to the register 311-j selected by the output line selection signal, and the address RAj stored in the register 311-j is selected by the selector 331 and supplied to the shared buffer memory 22 and the next address management unit 34. The next address NAj read out from the next address memory 340 in the next address management unit 34 is written as a new next read address RAj into the register 311-j.

Although a reset circuit is not shown in FIG. 7 for simplicity, as a rest signal of the register 313-j, a result of comparison between the last address EAj and the packet head address RAj is used. Specifically, when the last read address EAj and the next read address RAj coincide with each other, the output queue becomes idle in the next reading cycle. Consequently, the queue flag Fj is cleared. The register 313-j is reset in such a manner that, for example, a comparison circuit for detecting a match between an out-put of the selector 332 and an output of the selector 331 is provided and a match detection signal output from the comparison circuit is used.

Figure 8:
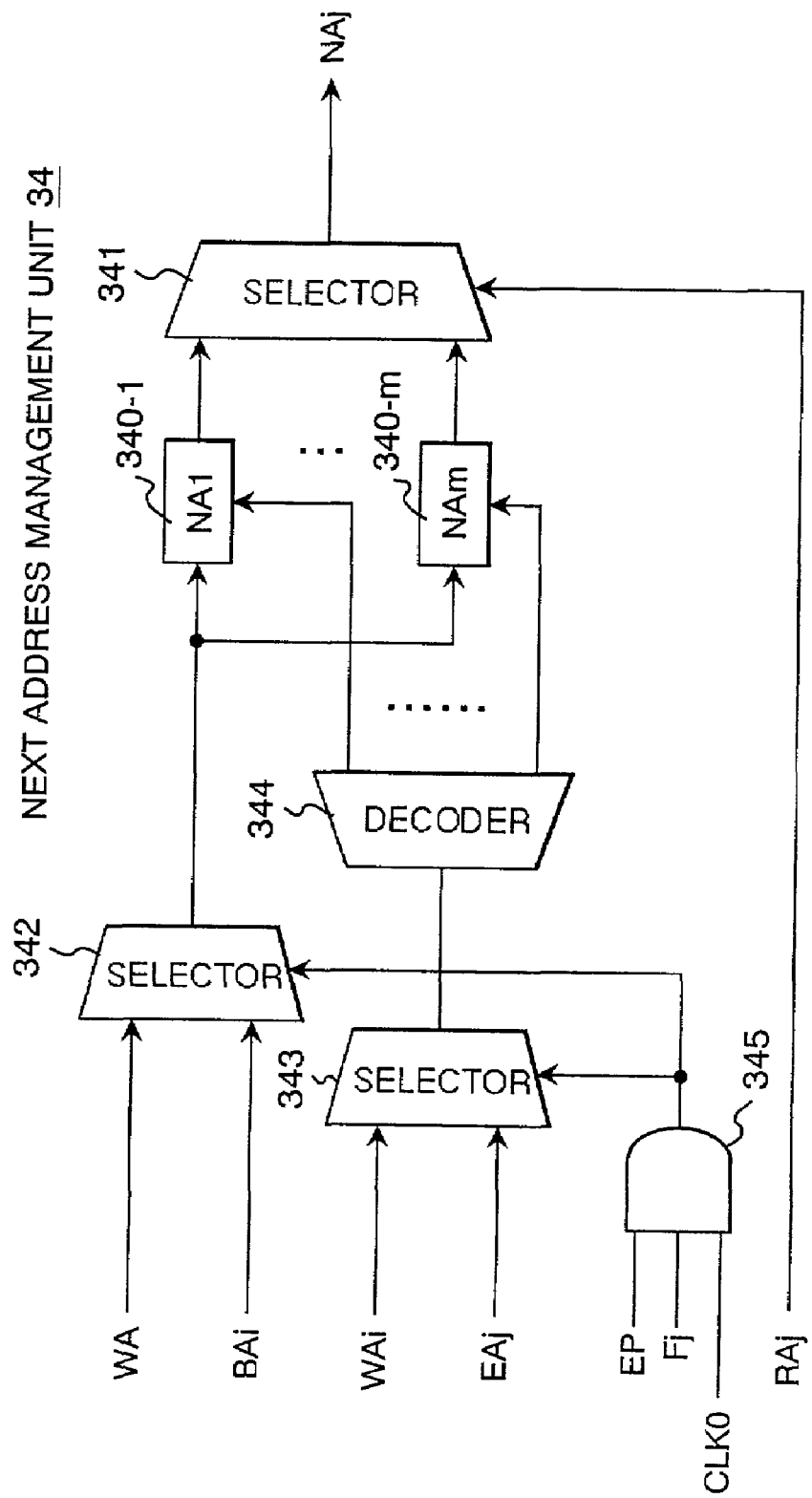
FIG. 8 shows an example of a next address management unit 34 illustrated in FIG. 2.

FIG. 8 shows an example of the next address management unit 34. The next address management unit 34 has: registers 340-1 to 340-m for storing next addresses NA1 to NAm; a selector 341 for selecting one of output addresses from the registers; a selector 342 for selecting either the write address WA obtained from the idle address FIFO 35 or the packet head address BAi supplied from the input queue controller 32; a selector 343 for selecting either the latest address WAi supplied from the input queue controller 32 or the last read address EAj supplied from the output queue controller 33; a decoder 344 connected to the selector 343; and an AND circuit 345.

To the AND circuit 345, the tail indication flag signal EP supplied from the header analyzer 31, the queue flag Fj supplied from the output queue controller 33, and the clock signal CLK0 are supplied. The clock signal CLK0 is a signal which is at the low level in the first half of the writing cycle of each data block and changes to the high level in the latter half.

The selector 342 selects, in the writing cycle, the write address WA when the output signal of the AND circuit 345 is at the low level, and selects the packet head address BAi when the output signal is at the high level. The selected signal is supplied to the registers 340-1 to 340-m. The selector 343 selects the write address WAi of the previous data block when the output signal of the AND circuit 345 is at the low level, and selects the last read address EAj of a preceding packet when the output signal is at the high level. The selected address is supplied to the decoder 344. The decoder 344 decodes the address received from the selector 343 and supplies a write enable signal to the register 340-k corresponding to the input address.

Among the three signals EP, Fj, and CLK0 supplied to the AND circuit 345, the signal CLK0 is always at the low level in the first half of each writing cycle. Consequently, in the first half of each writing cycle, irrespective of the states of the input signals EP and Fj, the output of the AND circuit 345 is at the low level, and the selectors 342 and 343 select the addresses WA and WAi, respectively. The write address WA of the latest data block is therefore stored in a storage area (register 340-k) corresponding to the write address WAi of the previous data block, thereby forming a linked address list for each input queue shown in FIG. 3.

In the latter half of each writing cycle, since the signal CLK0 goes high, the output of the AND circuit 345 depends on the levels of the input signals EP and Fj. When both the input signals EP and Fj are high, the output of the AND circuit 345 turns on. Specifically, in the case where the data block to be written into the shared buffer memory 22 is the last data block of a variable length packet (that is, the signal EP is "on"), and the variable length packet is registered in the output queue being used (that is, the signal Fj is "on"), the output of the AND circuit 345 turns on, and the selectors 342 and 343 select the addresses BAi and EAj respectively. Accordingly, the head address BAi of the variable length packet is stored in the storage area (register 340-q) designated by the last write address EAj of the output queue. In this manner, the data block train of the subsequent packet is linked to the last data block of the preceding packet in the output queue by the linked address list.

In the case where the data block to be written in the shared buffer memory 22 is a head data block or intermediate data block of a variable length packet (that is, the signal EP is "off") or the last data block of a variable length packet to be registered in an idle output queue (that is, the signal Fj is "off"), the output of the AND circuit 345 is held at the low level during the writing cycle. Consequently, the operation of adding the linked address list to the output queue is not performed.

In the reading cycle, the selector 341 selects the register 340-p corresponding to the read address RAj supplied from the output queue controller 33 and returns the address stored in the register 340-p as a new next address NAj to the output queue controller 33. The next address NAj is stored in the register 311-j in the output queue controller 33 as a new next read address RAj to be used in the next reading cycle of the same output queue.

Figure 9:
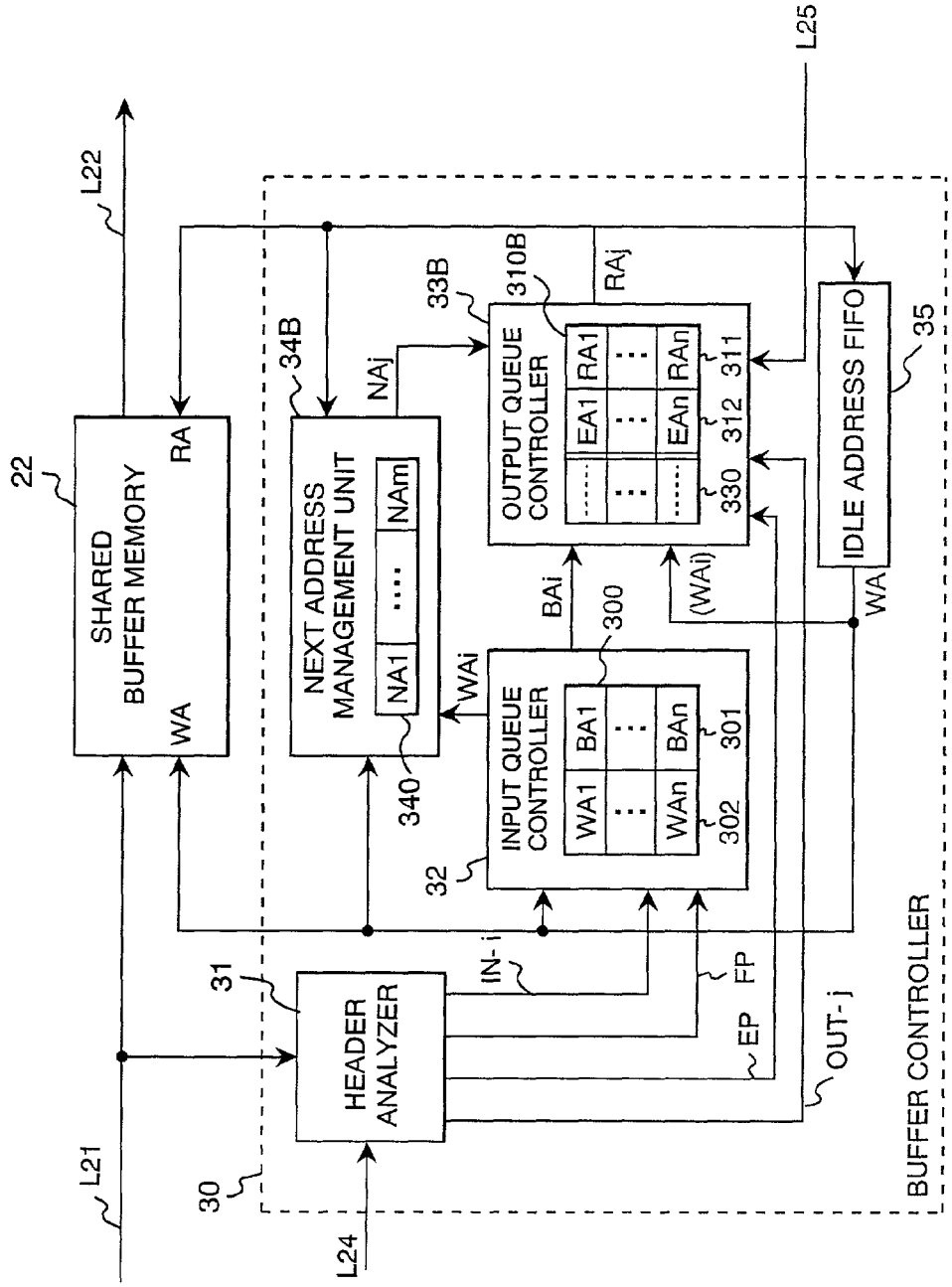
FIG. 9 shows a second embodiment of the buffer controller 30.

FIG. 9 is a block diagram showing a second embodiment of the buffer controller 30. The buffer controller 30 of the second embodiment includes the header analyzer 31, the input queue controller 32, the output queue controller 33B, a next address management unit 34B, and the idle address memory (FIFO) 35 for storing therein idle addresses of the shared buffer memory 20. The header analyzer 31 and the input queue controller 32 have functions similar to those in the first embodiment shown in FIG. 2. The output queue controller 33B has an output queue address table 310B and an output standby buffer 330.

The output queue address table 310B is used to store, for each output line, a read address 311 (next read address RAj (j=1 to n)) of a data block located at the head of an output queue, and a read address 312 (last read address EAj (j=1 to n) of a data block located at the end of the output queue. In the following description, a table region corresponding to the j-th output line LO-j in the output queue address table 310 is indicated by reference numeral 310-j.

The output standby buffer 330 is used to temporarily store the read addresses of data blocks for subsequent packets to be transmitted to the same output line in an FIFO manner when the addresses RAj and EAj for reading out the data blocks of the preceding packet remain in the output queue address table 310-j. In the output standby buffer 330, a buffer area 330B-j for storing the read address BAj of the first data block of a succeeding packet and a buffer area 330W-j for storing the read address WAj of the last data block of the succeeding packet are prepared in correspondence with the output lines. A pair of read addresses stored in the buffer areas 330B-j and 330W-j are transferred to the table area 310-j in the output queue address table at a time point when all of the data blocks of the preceding packet are read out from the shared buffer memory and the output queue address table becomes substantially idle.

The next address management unit 34B has, in a manner similar to the first example, the next address memory 340 comprising of a plurality of address storage areas NA1 to NAm of the number equal to the number "m" of data blocks which can be stored in the shared buffer memory 22. Each of the storage areas in the next address memory 340 is used to form linked address lists each for sequentially reading out the data blocks trains registered in the input queue in accordance with the registration order. Assuming now that variable length packets heading for the same output line LO-3 is received from the input lines LI-1 and LI-2, the function of the buffer controller 30 will be described in detail with reference to FIGS. 10 to 12 while paying attention to the packet head address BA1 and the latest address WA1 of the input queue corresponding to the input line LI-1, the packet head address BA2 and the latest address WA2 of the input queue corresponding to the input line LI-2, and the next read address RA3 and the last read address EA3 of the output queue corresponding to the output line LO-2.

Figure 10:
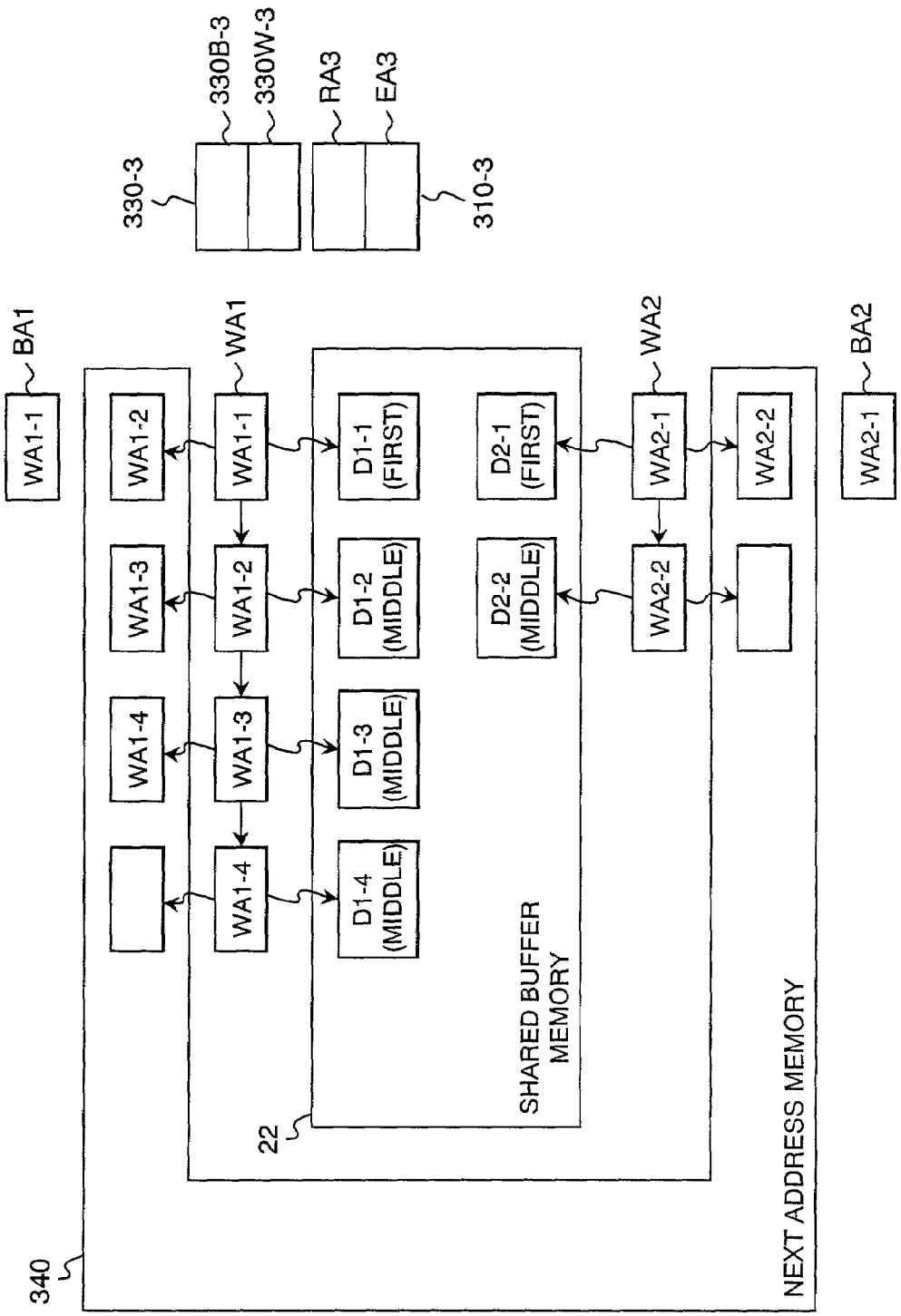
FIG. 10 is a diagram for explaining the states of data blocks stored in the shared buffer memory 22, and the contents of the next address memory 340 and the input queue address table 300 when controlled by the buffer controller 30 in the second embodiment.

FIG. 10 shows a state of the input queue address table 300 at a time point the data blocks D1-1 to D1-4 output from the input line interface 10-1 and the data blocks D2-1 and D2-2 output from the input line interface 10-2 are written into the shared buffer memory 22.

In a manner similar to FIG. 3, WA1-1 to WA1-4 denote values of the write addresses WA of the data blocks D1-1 to D1-4 obtained from the idle address FIFO 35, and WA2-1 to WA2-2 indicate values of the write addresses WA of the data blocks D2-1 to D2-2. RA3 and EA3 indicate the contents of the output queue address table entry 310-3 corresponding to the destination output line LO-3 of the data blocks D1-1 to D1-4 and the data blocks D2-1 and D2-2. FIG. 10 shows a state before the input line interfaces 10-1 and 10-2 output the last data block of the variable length packet. There is no valid data in the output queue corresponding to the output line LO-3 and the output standby buffer 330-3 and the output queue address table 310-3 are idle.

Figure 11:
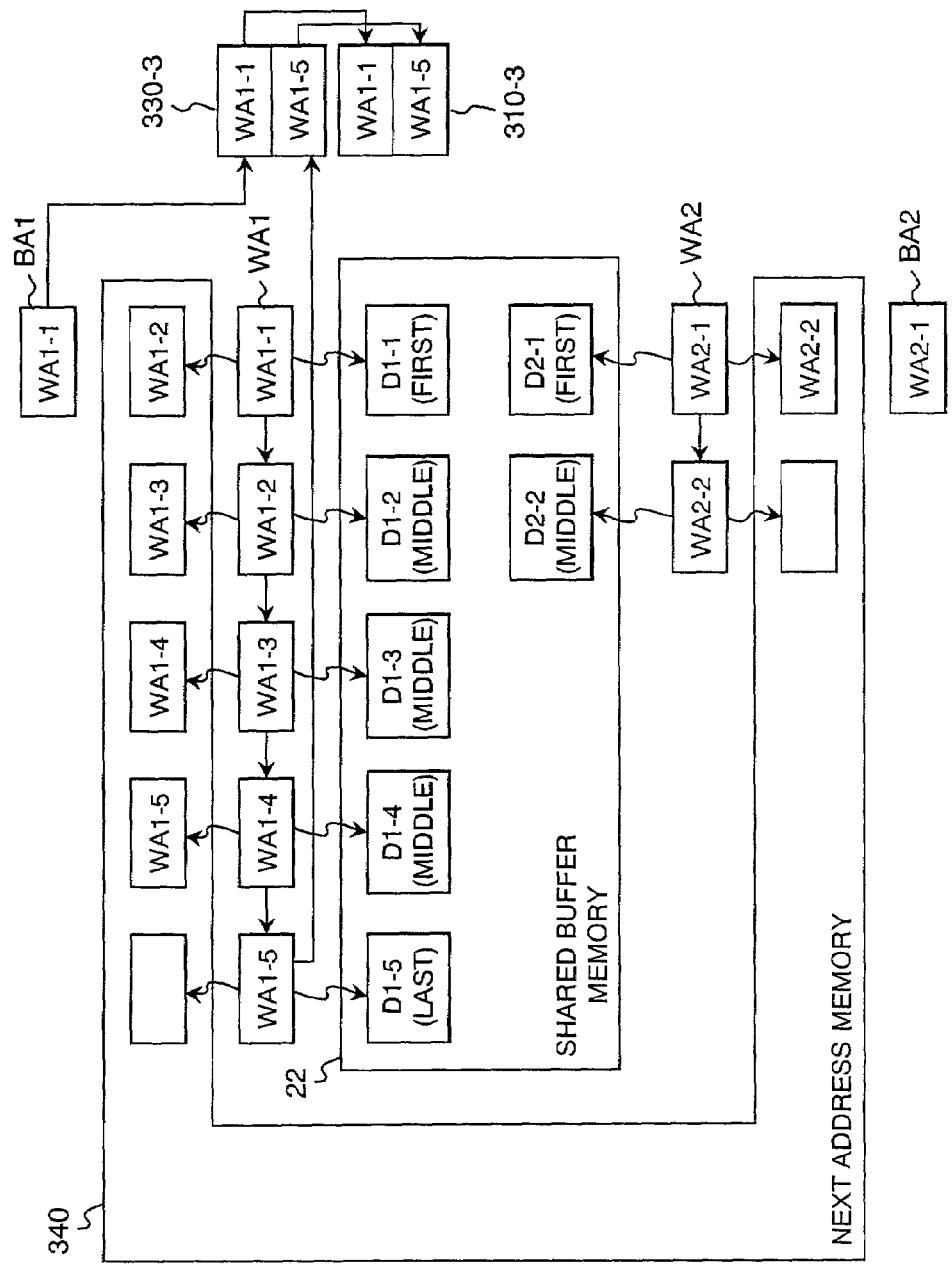
FIG. 11 is a diagram for explaining the relations among the input queue address table 300, the output queue address table 310, and an output standby buffer 330 when the last data block in a variable length packet arrives.

FIG. 11 shows the operations of the buffer controller 30 at the time point when the last data block D1-5 of the variable length packet output from the input line interface 10-1 is written into the shared buffer memory 22. The buffer controller 30 stores the write address WA1-5 of the last data block D1-5 into the next address memory 340 and, after that, transfers the contents (WA1-1) of the packet head address BA1 in the input queue and the contents (WA1-5) of the latest address WA1 to the output standby buffer 330-3. If the output queue address table 310-3 is vacant, as shown in FIG. 11, the addresses stored in the output standby buffer 330-3 are transferred to RA3 and EA3 of the output queue address tables. Since the contents of the latest address WA1 is the new write address WA obtained from the idle address FIFO 35 in this case, in place of the latest address WA1, the write address WA obtained from the idle address FIFO 35 may be stored in EA3 in the output queue address table.

Figure 12:
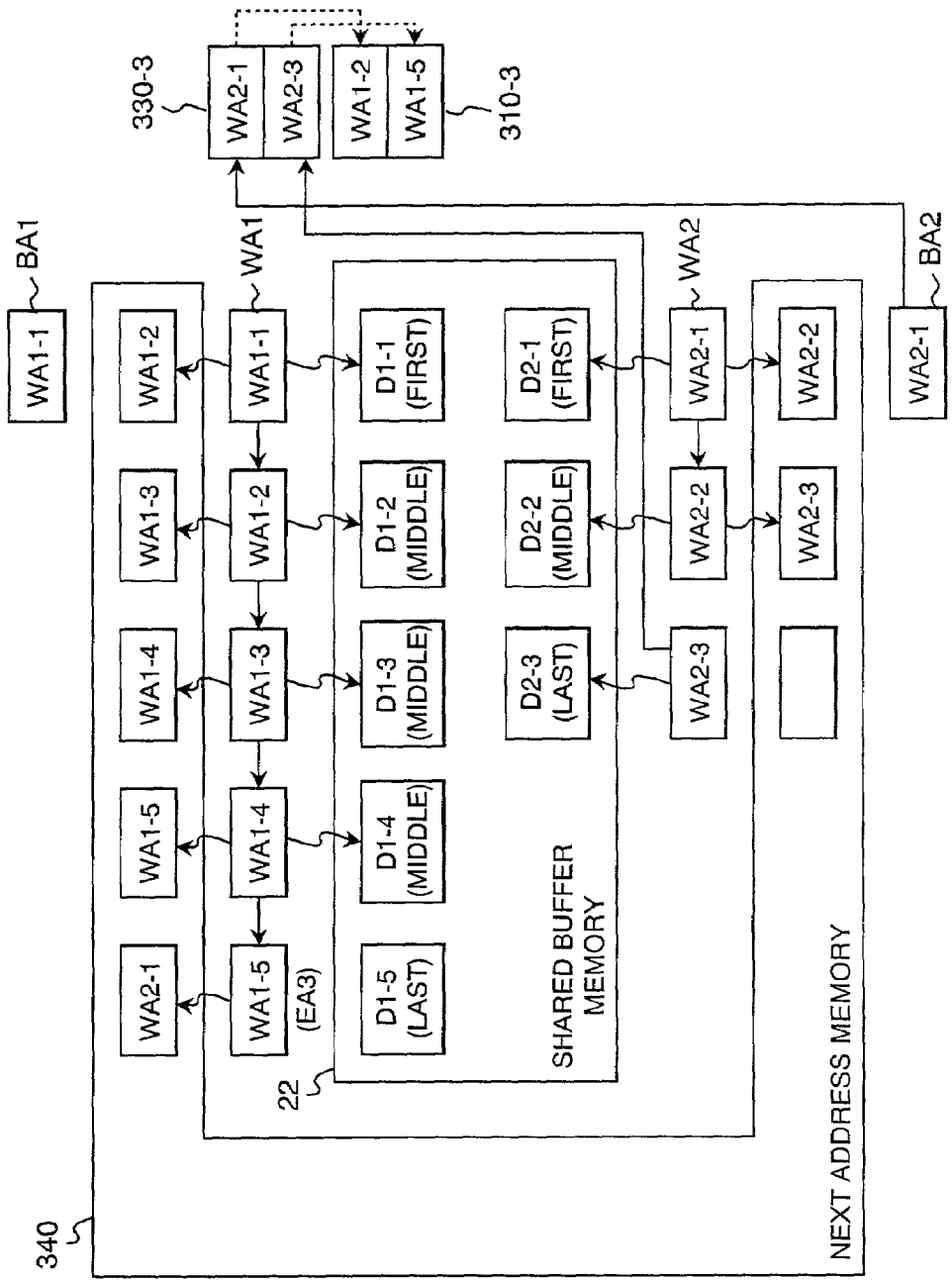
FIG. 12 is a diagram for explaining the relations among the input queue address table 300, the output queue address table 310, and the output standby buffer 330 when the last data block of another variable length packet arrives in a state where an output queue is in use.

FIG. 12 shows operations of the buffer controller 30 in the case of writing the last data block D2-3 of the variable length packet output from the input line interface 10-2 into the shared buffer memory 22 in a state where the output queue of the output line LO-3 is already in use. In this case, the buffer controller 30 stores the write address WA2-3 of the last data block D2-3 into the next address memory 340, and transfers the contents (WA2-1) of the packet head address BA2 and the contents (WA2-3) of the latest address WA2 to the output standby buffer 330-3. The addresses WA2-1 and WA2-3 stored in the output standby buffer 330-3 are transferred to the output queue address table 310-3 when the contents of the output queue address table 310-3 became no use, that is, in the reading cycle in which the values of the next read address RA3 and the last read address EA3 match with each other.

When the variable length packet received by the line interface is so short as the entire received packet can be set within a fixed length data block, in the writing cycle of the data block, the head indication flag signal FP and the tail indication flag signal EP output from the header analyzer 31 simultaneously turn on. In this case, the contents of the packet head address BAi and the latest address WAi registered in the input queue address table 300 in response to the head indication flag signal FP is immediately transferred to the output standby buffer 330-j in response to the tail indication flag signal EP. If the output queue of the output line LO-j as a destination of the data block is in the idle state, in a manner similar to FIG. 11, the contents of the packet head address BAi and the latest address WAi stored in the standby buffer 330-j is transferred to the output queue address table 310-j. When the output queue is already in use, in a manner similar to FIG. 12, the contents of the output standby buffer 330-j is held.

The output queue controller 33 refers to the output queue address table area 310-j specified by the output line selection signal output to the signal line L25 in a reading cycle, reads out a data block from the shared buffer memory 22 in accordance with the next read address RAj, and reads out a new next address NAj from the next address memory 340. The used next read address RAj is released to the idle address FIFO 35. The new next address NAj read out from the next address memory 340 is stored as a new next read address RAj into the output queue address table 310-j. In the reading cycle of the last data block of each packet, the next address NAj read out from the next address memory 340 becomes invalid, and the head address of the next packet obtained from the standby buffer is set in the output queue address table 310-j as a new next read address RAj.

Figure 13:
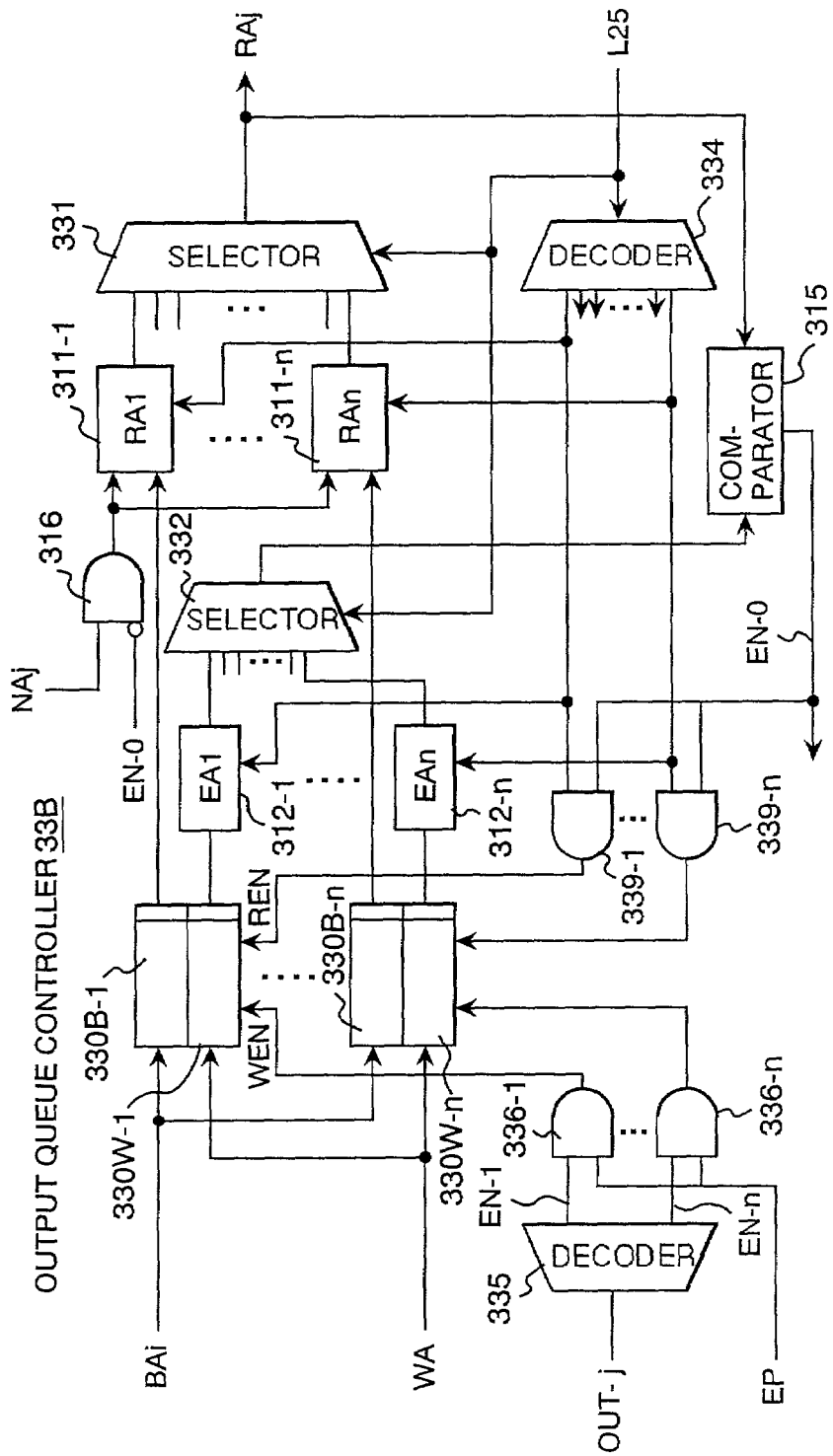
FIG. 13 shows an example of an output queue controller 33B illustrated in FIG. 9.

FIG. 13 shows an example of the output queue controller 33B. The output queue controller 33B includes: the registers 311-1 to 311-n for storing the next read addresses RA1 to RAn; the registers 312-1 to 312-n for storing the last read addresses EA1 to EAn; output standby buffers (FIFO) 330B-1 to 330B-n for storing packet head block address; and output standby buffers (FIFO) 330W-1 to 330W-n for storing packet tail block address.

The output queue controller 33B also includes: the selector 331 for selecting one of output addresses from the registers 311-1 to 311-n; the selector 332 for selecting one of output addresses from the registers 312-1 to 312-n; the decoder 334 for decoding the output line selection signal output from the output counter 25 to the signal line L25; the decoder 335 for decoding the output line number OUT-j output from the header analyzer 31 and setting one of the enable signals EN-1 to EN-n at the high level; the AND circuits 336-1 to 336-n for making the enable signals EN-1 to EN-n valid when the tail indication flag signal EP output from the header analyzer 31 turns on; a comparator 315 for comparing the read address RAj output from the selector 331 with the last read address EAj output from the selector 332 and, when RAj and EAj match with each other, setting the enable signal EN-0 at the high level; an AND circuit 316 for supplying the next address NAj output from the next address management unit 34 to the registers 311-1 to 311-n when the enable signal EN-0 is at the low level; and AND circuits 339-1 to 339-n for passing the output signal of the decoder 334 when the enable signal EN-0 is "on".

To the output standby buffers 330-j (330B-j and 330W-j, j=1 to n), output signals of the AND circuits 336-1 to 336-n are supplied as write enable signals WEN. In a writing cycle, when the tail indication flag signal EP turns on, the write enable signal WEN from the AND circuit 336-j corresponding to the output line number OUT-j becomes valid, the packet head address BAi output from the input queue controller 32 is set in the buffer area 330B-j, and the write address WA output from the idle address FIFO 35 is set in the buffer area 330W-j. To the output standby buffers 330-j (330B-j and 330W-j), the output signals of the AND circuits 339-1 to 339-n are supplied as read enable signals REN.

In a reading cycle, when the output signal EN-0 of the comparator 315 turns on, an output signal of the AND circuit 339-j corresponding to the output line number OUT-j turns on. By the operations, a set of the addresses BAj and WAj are read out from the buffer areas 330B-j and 330W-j and are set as the next read address RAj and the last read address EAj in the registers 311-j and 312-j, respectively.

To each of the registers 311-1 to 311-n, the output of the decoder 334 is supplied as a read enable signal. Output lines of the registers are connected to the selector 331 to which the output line selection signal from the signal line L25 is supplied as a control signal. In each reading cycle, therefore, the contents of the register 311-j designated by the output line selection signal is output as the next read address RAj. By using the address RAj, a data block to be output to the output line LOj is read out from the shared buffer memory 22 and supplied via the demultiplexer 23 to the output line interface 20-j. By the address RAj, an address NAj indicative of the next data block to be output to the output line LOj is read out from the next address management unit 34B. The address NAj is supplied to the registers 311-1 to 311-n via the AND circuit 316.

In a manner similar to the registers 311-1 to 311-n, the output of the decoder 334 is supplied as a read enable signal to the registers 312-1 to 312-n. Output lines of the registers are connected to the selector 332 to which the output line selection signal is supplied as a selection signal. Consequently, in each reading cycle, the contents of the register 312-j designated by the output line selection signal is output as a last read address EAj from the selector 332.

The output signal EN-0 of the comparator 315 turns on when the next read address RAj output from the selector 331 and the last read address EAj output from the selector 332 match with each other that is, in the reading cycle of the last data block of each packet. As described above, the packet head address BAi in the output standby buffer 330B-j is transferred to the register 311-j. In the reading cycle in which the output signal EN-0 of the comparator 315 is "off", that is, in the reading cycle of the head data block or intermediate data block in a packet, the AND circuit 316 is opened, and the next address NAj read out from the next address management unit 34 is set in the register 311-j. In this manner, the data blocks in the output queue corresponding to the output line LO-j are sequentially read out.

Figure 14:
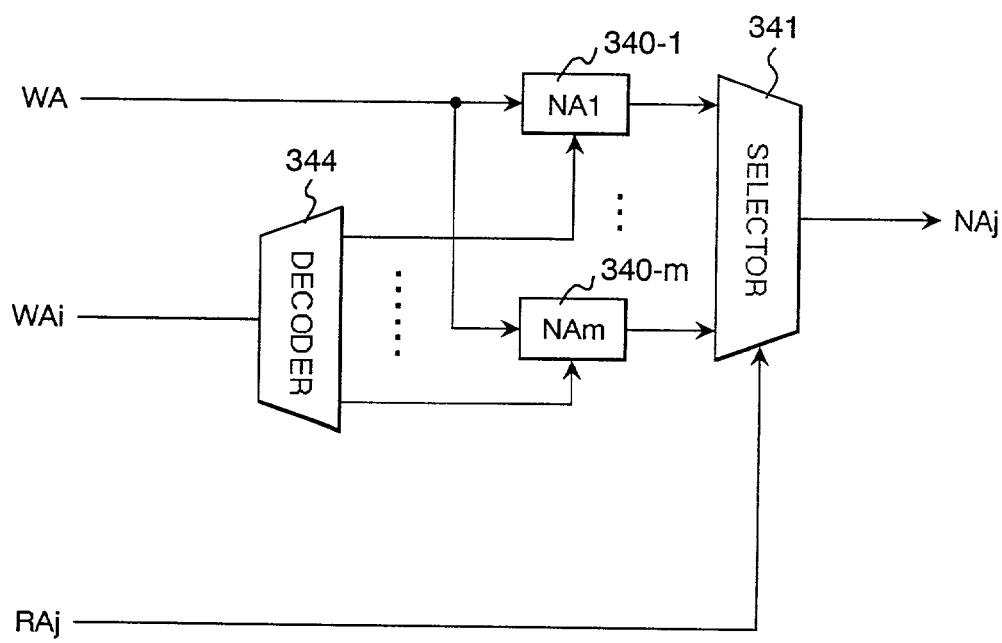
FIG. 14 shows an example of a next address management unit 34B illustrated in FIG. 9.

FIG. 14 shows an example of the next address management unit 34B. The next address management unit 34B comprises: the registers 340-1 to 340-m for storing the next addresses NA1 to NAm; the selector 341 for selecting one of output addresses from the registers; and the decoder 344 for decoding the latest address WAi supplied from the input queue controller 32 and supplying the write enable signal to the register 340-i corresponding to the latest address WAi.

The next address management unit 34B stores, in each writing cycle, the write address WA of the latest data block into the storage area (register 340-k) corresponding to the write address WAi of the previous data block in the input queue, thereby forming a linked address list of each input queue shown in FIG. 10. In the reading cycle, the selector 341 selects the register 340-p corresponding to the read address RAj supplied from the output queue controller 33, and returns the address stored in the register 340-p as the next address NAj to the output queue controller 33. The next address NAj is stored into the register 311-j, as a new next read address RAj to be used in the next reading cycle in the output queue controller 33.

Figure 15:
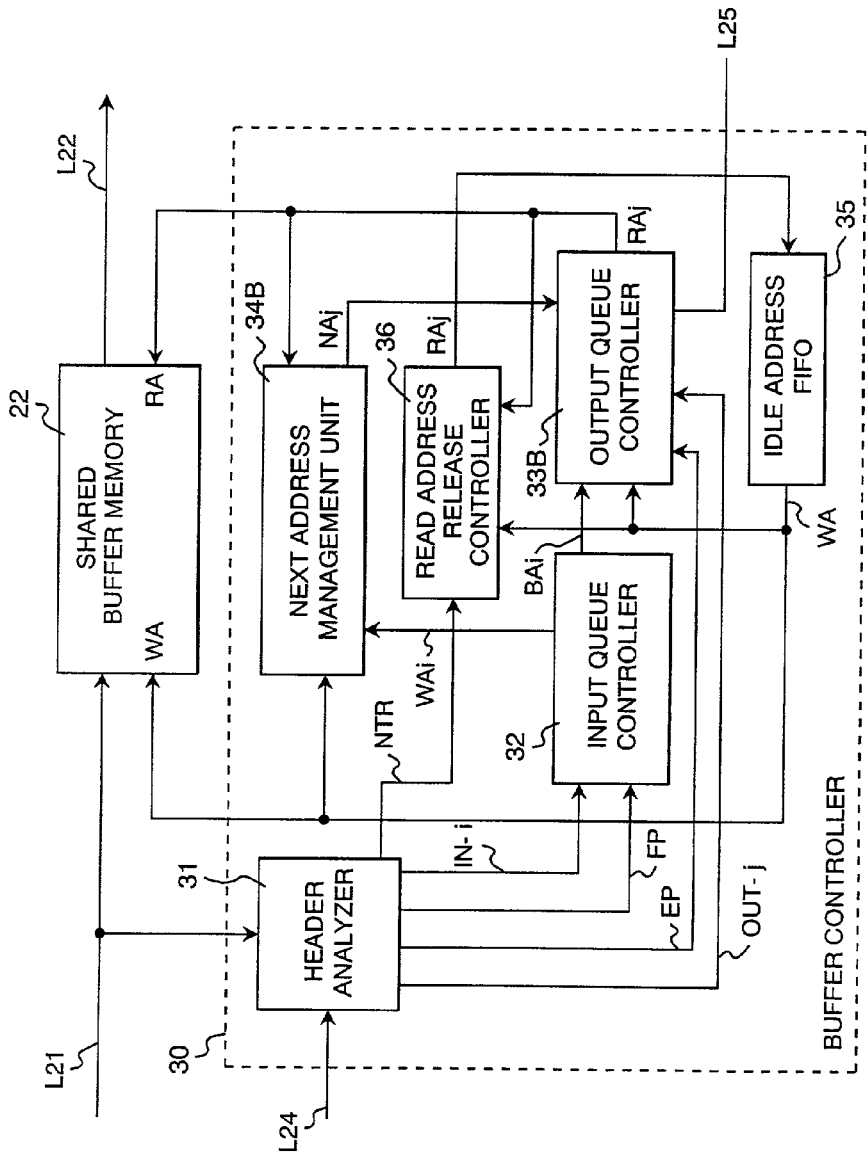
FIG. 15 shows a third embodiment of the buffer controller 30.

FIG. 15 shows a third embodiment of the buffer controller 30 having a broadcasting or multicasting function of transferring the same packet to a plurality of output lines. The buffer controller 30 shown here has, in a manner similar to the buffer controller 30 of the second example shown in FIG. 9, the header analyzer 31, input queue controller 32, output queue controller 33B, next address management unit 34B, and idle address FIFO 35 and has, as a new element, a read address release controller 36.

Each of the input line interfaces 10-i (i=1 to n) adds an internal header for designating a plurality of output lines to each of data blocks obtained by dividing a received packet from the input line LI-i when the received packet is a broadcast (multicast) packet to be forwarded to a plurality of output lines. In order to designate a plurality of output lines at the same time, for example, it is preferable to employ a bit pattern as the contents of the output line number field in the internal header, said bit pattern including n bits corresponding to the output lines LO-1 to LO-n for indicating an output line as a packet destination by the bit "1".

The header analyzer 31 analyzes the internal header of each data block output from the multiplexer 21 to the signal line L21, and generates the input line number IN-i, output line number OUT-j, head indication flag signal FP, tail indication flag signal EP, and the number of destination output lines NTR of the received packet. As the output line number OUT-j, a bit pattern indicated in the output line number field in the internal header is output. In this case, the number NTR of destination output lines equal to the number of the bits "1" included in the output line number field.

Each data block output from the multiplexer 21 to the signal line L21 is stored in the shared buffer memory 22, in a manner similar to the first and second embodiments, by using the address WA obtained from the idle address FIFO 35 as a write address. By the function of the input queue controller 32 and the next address management unit 34, an input queue corresponding to the input line number IN-i is formed. When the data block stored in the shared buffer memory 22 is the last data block of a variable length packet, the tail indication flag signal EP turns on. Consequently, the packet head address BAi output from the input queue controller 32 and the latest address WA (=WAi) obtained from the idle address FIFO 35 are set in the output standby buffer 330 in the output queue controller 33B.

In the output queue controller 33B shown in FIG. 13, when the output line number OUT-j supplied to the decoder 335 takes the form of a bit pattern expressing the destination output line by the bit "1" the decoder 335 can set a group of enable signals simultaneously into the "on" state in accordance with the bit pattern. When the tail indication flag signal EP turns on, the enable signals EN-1 to EN-n output from the decoder 335 are supplied as a write enable signal WEN to the output standby buffers 330-1 (330B-1 and 330W-1) to 330-*n* (330B-n and 330W-n) via the AND circuits 336-1 to 336-*n*.

When the last data block belongs to a uni-cast packet, only one enable signal EN-j corresponding to the output line of the uni-cast packet turns on. Consequently, in a manner similar to the second example, the addresses BAi and WA are set to the specific output standby buffers 330B-j and 330W-j to which the enable signal EN-j is supplied. If the last data block belongs to a broadcast packet, a plurality of enable signals EN-j (j=j1, j2, j3, . . . ) corresponding to the bit pattern of the output line number OUT-j turn on at the same time. The addresses BAi and WA are accordingly simultaneously set in the plurality of output buffers 330B-j and 330W-j (j=j1, j2, j3, . . . ) to which the enable signal at the high level is supplied.

The addresses BAi and WA set in the output standby buffers 330-1 to 330-*n* are, in a manner similar to the second embodiment, transferred to the next read address registers 311-1 to 311-*n* and the last read address registers 312-1 to 312-*n*. In accordance with the read address RAj indicated by the next read address registers 311-1 to 311-*n*, the data blocks are read out from the shared buffer memory 22. Regarding data blocks belonging to a broadcast packet, as described above, the same linked address list is registered in a plurality of output queues, the same data block is repeatedly read out a plurality of times.

In the first and second embodiment directed only for a uni-cast packet, as shown in FIGS. 2 and 9, it is sufficient to release the read address RAj to the idle address FIFO 35 when a data block is read out from the shared buffer memory 22. In contrast, in the case where broadcast packets are processed as in the third embodiment, it is necessary to confirm the completion of the multi-casting to a plurality of designated output lines and then to release the read address RAj to the idle address FIFO 35. The read address release controller 36 is used to confirm the completion of the multi-casting for each data block to release the read address RAj.

Figure 16:
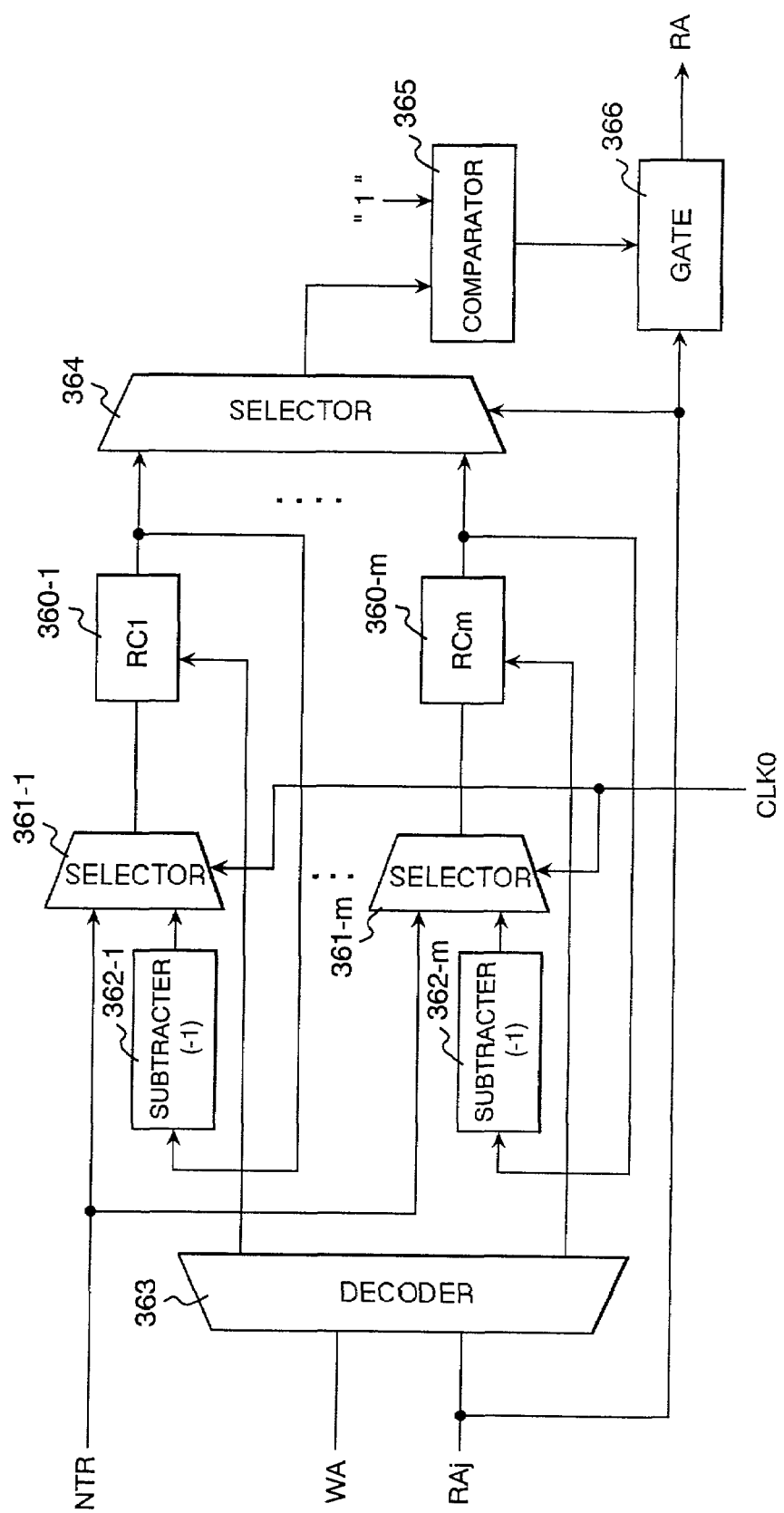
FIG. 16 shows an example of a read address release controller 36 illustrated in FIG. 15.

FIG. 16 shows an example of the read address release controller 36. The read address release controller 36 shown here has: registers (memory areas) 360-1 to 360-*m* for storing the number of reading times RC of a data block in correspondence with the write address WA; selectors 361-1 to 361-*m* for selecting the input to the registers 360-1 to 360-*m*; subtracters 362-1 to 362-*m* for decrementing (subtracting one) the values of the registers 360-1 to 360-*m*; a decoder 363 for decoding the write address WA and the read address RAj and generating an enable signal corresponding to the addresses; a selector 364 for selecting the set value (the number RC of reading times) of the register 360-*q* corresponding to the read address RAj among the registers 360-1 to 360-*m*; a comparator 365; and a gate 366.

To each of the selectors 361-*k* (k=1 to m), the clock CLK0 indicative of a writing cycle is supplied as a selection control signal. Each of the selectors 361-*k* selects, in each writing cycle, the number of destination output lines NTR output from the header analyzer 31, and, in each reading cycle, the output of the subtracter 362-*k* (k=1 to m) The outputs of the selectors 361-*k* are supplied to registers 360-*k* (k=1 to m) for storing the number of reading times. The outputs of the decoder 363 are supplied to the registers 360-1 to 360-*m* as write enable signals. In each writing cycle, the number of output lines NTR is set in the register 360-*p* corresponding to the write address WA. In each reading cycle, the value of the register 360-*q* corresponding to the read address RAj is selected by the selector 364 and is supplied to the comparator 365. At this time, the value of the register 360-*q* is supplied to the subtracter 362-*q*, and a value obtained by decrementing the number of reading times RCq by one is set again in the register 360-*q*.

For example, in a writing cycle of a data block belonging to a uni-cast packet, the number of destination output lines NTR (=1) is set as the number RCp of reading times into the register 360-*p* corresponding to the write address WA. When the data block is read out in a reading cycle in accordance with the address RAj, the number of reading times RCp (= 1) is supplied to the comparator 365. When the value of RCp is "1", the comparator 365 opens the gate 366 to release the read address RAj to the idle address FIFO 35. Accordingly, an unnecessary write address, that is, read address RAj of the data block belonging to the uni-cast packet is immediately released when the data block is read out.

In a writing cycle of a data block belonging to a broadcast (multicast) packet, NTR having a value larger than "1" is set as the number of reading times RCp into the register 360-*p* corresponding to the write address WA. Consequently, even when the data block is read out from the shared buffer memory 22, as far as the decremented RCp value does not reach "1", the gate 366 remains closed. The read address RAj is released to the idle address FIFO 35 when the number of reading times of the same data block reaches the number designated by NTR.

In the foregoing embodiments, the buffer controller 30 forms an input queue for each input line number and transfers the linked address list for the input queue to an output queue at the time point when the last data block of a variable length packet arrives. According to the invention, however, it is sufficient to form the input queue for each variable length packet. In place of the input line number, other identification information peculiar to a variable length packet may be used. In the embodiments, an input line number is set in the internal header of each data block, so that the header analyzer 31 outputs the input line number IN-j on the basis of the internal header. However, the input line number IN-j may be generated on the basis of the input line selection signal output from the input counter 24.

Figure 17:
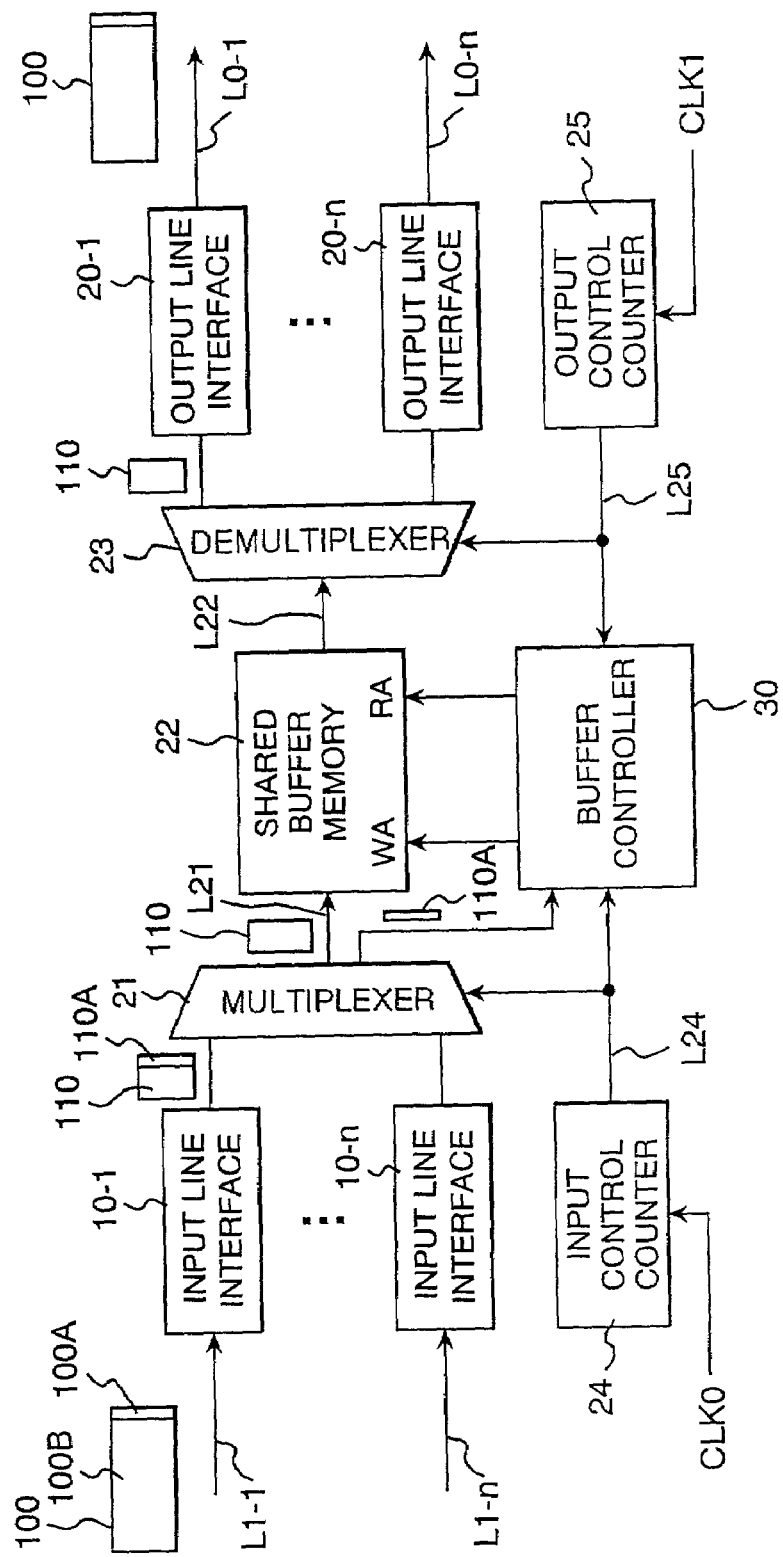
FIG. 17 shows a packet switch according to another embodiment of the invention.

In the foregoing examples, each of the input line interfaces 10-*i* (i=1 to n) divides the received packet 100 into a plurality of fixed length data blocks 110, adds the internal header 110A to each data block, and outputs the resultant data blocks to the multiplexer 21, and the data block with the internal header is written to and read out from the shared buffer memory 22. As another embodiment of the invention, for example, as shown in FIG. 17, it is also possible to separate the data block 110 and the internal header 110A from each other by the multiplexer 21 so that the internal header 110A is supplied to the header analyzer 31 in the buffer controller 30, and only the data block 110 portion is supplied to the shared buffer memory 22. With the configuration, the memory capacity of the shared buffer memory 22 can be effectively used, and it is unnecessary to separate the internal header from the data block by each of the output line interfaces 20-*i*.

As further another embodiment of the invention, the following manner is also possible. Each input line interface 10-*i* outputs the fixed length data block 110 to the multiplexer 21 without adding the internal header, the header analyzer 31 in the buffer controller 30 analyzes the packet header included in the head data block of each variable length packet, manages the output line number and the number of subsequent data blocks on a management table for each input line, refers to the management table in accordance with the input line selection signal supplied from the input control counter 24, and generates the above-described control signals IN-i, FP, EP, OUT-j, and the like. The conversion from the variable length packet 100 to the fixed length data block 110 may be performed by the multiplexer 21 in place of each of the input line interfaces 10-i.

Although the packet switch connected to the plurality of input and output lines has been described in the embodiments, the buffer control of the invention can be also applied to a switching structure, such as a multiplexer, for outputting variable length packets received from a plurality of input lines to one output line.

As described above, according to the present invention, the input queue is formed for each variable length packet and, when the last data block of a variable length packet is written into the buffer memory, the linked address registered in the input queue is transferred to the output queue. Consequently, in the case where a plurality of variable length packets headed for the same output line are supplied in parallel, the present invention can prevent data blocks of one variable length packet from entering into a data block train belonging to another variable length packet in an output queue. By sequentially transmitting the data blocks received from the output queue to the output line, the present invention can transfer the received packets accurately to a destination apparatus. According to the invention, only the linked address list for reading out the data block train is transferred to the output queue without moving the data block train stored in the shared buffer memory. Consequently, variable length packets can be switched at high speed.

As described in the second embodiment, if each output queue is constructed by a standby buffer and an address table or register, since the addresses of the head data block and the last data block of a variable length packet standing-by to be output are temporarily stored in the standby buffer, and the next read address and the last read address of the variable length packet being output are managed by the address table, each of the packets can be transferred with reliability even when a number of variable length packets destined for the same output line are received.

As described in the third embodiment, by registering the linked address of the same variable length packet into a plurality of output queues and releasing the read address when the number of reading times of the same data block reaches a specified value, a multicast transfer effectively using the shared buffer memory can be realized.

What is claimed is:

1. A packet switch for transferring variable length packets received by plurality of input line interfaces to at least one of output line interfaces on a fixed length data block unit basis, comprising:
   a shared buffer memory commonly used by said input line interfaces;
   a multiplexer connected to said input line interfaces for multiplexing the received packets from the input line interfaces on the fixed length data block unit basis and supplying fixed length data blocks to said shared buffer memory; and
   a buffer controller connected to said shared buffer memory for controlling writing and reading out of each of said fixed length data blocks to and from the shared buffer memory,
   wherein said buffer controller comprises:
   a first controller for forming a plurality of input queues corresponding to variable length packets by linking write addresses of fixed length data blocks, and for linking an input queue, of which the last fixed length data block of a variable length packet has been written to said shared buffer memory, to an output queue corresponding to a destination output line of the variable length packet, and
   a second controller for accessing a plurality of output queues, each of which corresponds to one of said output line interfaces, in accordance with a predetermined order and for reading out fixed length data blocks from said shared buffer memory based on the linked addresses associated with said output queues.

2. A packet switch according to claim 1, wherein said buffer controller further comprises:
   an idle address memory for storing therein idle addresses of said shared buffer memory; and
   a next address memory for storing therein write addresses of fixed length data blocks stored in said shared buffer memory, and
   wherein said first controller writes a fixed length data block into said shared buffer memory based on the a write address obtained from said idle address memory, and stores in said next address memory in correspondence with said write address a write address to be used to write the next fixed length data block of the same variable length packet, thereby forming said input queue.

3. A packet switch according to claim 2, wherein each of said output queues comprises:
   an address table for storing therein a next read address and a last read address indicative of the next data block and the last data block to be sent to the destination output line, and
   wherein said first controller sets a write address of a head data block and a write address of a last data block of a variable length packet as said next read address and last read address into said address table corresponding to the destination output line of the variable length packet, respectively.

4. A packet switch according to claim 3, wherein said second controller comprises:
   means for reading out a fixed length data block and the address of a next fixed length data block from said shared buffer memory and said next address memory, respectively, based on the a next read address registered in each of said output queues;
   means for transferring the next read address to said idle address memory; and
   means for setting the address read out from said next address memory as a new next read address in the output queue.

5. A packet switch according to claim 2, wherein in the case of linking an input queue of a succeeding variable length packet to an output queue being in a state where the last read address of a preceding variable length packet is already registered, said first controller links within said next address memory a write address of a head data block of said succeeding variable length packet to the last read address of the preceding variable length packet.

6. A packet switch according to claim 1, further comprising:
   a demultiplexer connected between said shared buffer memory and said output line interfaces for distributing fixed length data blocks read out from said shared buffer memory to said output line interfaces.

7. A packet switch for transferring variable length packets received by a plurality of line interfaces to at least one of output line interfaces on a fixed length data block unit basis, comprising:
- a shared buffer memory commonly used by said plurality of input lines;
- a multiplexer connected to said input line interfaces for multiplexing the received packets from the input line interfaces on the fixed length data block unit basis and supplying the fixed length data blocks to said shared buffer memory; and
- a buffer controller for controlling writing and reading out of each of said fixed length data blocks to and from said shared buffer memory,
- wherein said buffer controller comprises:
- a first controller for forming a plurality of input queues corresponding to received variable length packets by linking write addresses of fixed length data blocks, and for linking an input queue of which the last fixed length data block of a variable length packet has been written to said shared buffer memory to an output queue corresponding to a destination output line, said output queue having a standby buffer, and
- a second controller for accessing a plurality of output queues, each of which corresponds to one of said output line interfaces, in accordance with a predetermined order and for reading out fixed length data blocks from said shared buffer memory based on the linked addresses associated with said output queues.

8. A packet switch according to claim 7, wherein said buffer control means comprises:
- an idle address memory for storing therein idle addresses of said shared buffer memory; and
- a next address memory for storing therein write addresses of fixed length data blocks stored in said shared buffer memory, and
- wherein said first controller writes a fixed length data block into said shared buffer memory based on the a write address obtained from said idle address memory, and stores in said next address memory in correspondence with said write address a write address to be used to write the next fixed length data block of the same variable length packet, thereby forming said input queue.

9. A packet switch according to claim 8, wherein each of said output queues comprises:
- a standby buffer for temporarily storing therein a write address of a head data block and a last data block of a variable length packet to be sent to a destination output line; and
- an address memory for storing therein a next read address and a last read address indicative of the next data block and the last data block to be sent to the destination output line,
- wherein said first controller registers a write address of a head data block and a write address of a last data block of a variable length packet in the input queue into said standby buffer corresponding to the destination output line and, when the address memory associated with the standby buffer enters an idle state, said second controller sets a pair of write addresses obtained from said standby buffer into said address memory.

10. A packet switch according to claim 9, wherein said second controller comprises:
- means for reading out a fixed length data block and the address of a next fixed length data block from said shared buffer memory and a next address memory, respectively, based on the a next read address registered in each of said output queues; and
- means for releasing the next read address, and setting the address read out from said next address memory as a new next read address for the output queue.

11. A packet switch according to claim 7, further comprising:
- a demultiplexer connected between said shared buffer memory and said output line interfaces for distributing fixed length data blocks read out from said shared buffer memory to said output line interfaces.

12. A packet switch for transferring variable length packets received by a plurality of input line interfaces to at least one of output line interfaces on a fixed length data block unit basis, comprising:
- a shared buffer memory commonly used by said plurality of input line interfaces;
- a multiplexer connected to said input line interfaces for multiplexing received packets from the input line interfaces on the fixed length data block unit basis and for supplying the fixed length data blocks to said shared buffer memory; and
- a buffer controller connected to said shared buffer memory for controlling writing and reading out of each of said fixed length data blocks to and from the shared buffer memory,
- wherein said buffer controller comprises:
- a first controller for forming a plurality of input queues corresponding to variable length packets by linking write addresses of fixed length data blocks stored in said shared buffer memory, and for linking an input queue of which the last fixed length data block of a variable length packet has been written to said shared buffer memory, to an output queue corresponding to a destination output line of the variable length packet, and
- a second controller for accessing a plurality of output queues, each of which is corresponding to one of said output line interfaces, in accordance with a predetermined order and for reading out fixed length data blocks from said shared buffer memory based on the linked addresses associated with said output queues, and
- wherein said first controller comprises:
- means for registering an input queue of which last fixed length data block has been written into a plurality of output queues.

13. A packet switch according to claim 12, wherein said buffer controller further comprises:
- an idle address memory for storing therein idle addresses of said shared buffer memory; and
- a next address memory for storing therein write address of fixed length data blocks stored in said shared buffer memory, and
- wherein said first controller writes a fixed length data block into said shared buffer memory based on the a write address obtained from said idle address memory, and stores in said next address memory in correspondence with said write address, a write address to be used to write the next fixed length data block of the same variable length packet, thereby forming said input queue.

14. A packet switch according to claim 13, wherein said second controller comprises:
- means for reading out a fixed length data block and the addresses of a next fixed length data block from said shared buffer memory and said next address memory, respectively, based on the a next read address registered in each of said output queues, and means for setting the address read out from said next address memory as a new next read address in the output queue.

15. A packet switch according to claim 12, wherein each of said output queues comprises:

a standby buffer for temporarily storing therein write addresses of a head data block and a last data block of a variable length packet to be sent to the destination output line; and an address memory for storing therein a next read address and a last read address indicative of the next data block and the last data block to be sent to the destination output lone, and wherein said first controller registers a write address of a head data block and a write address of a last data block of a variable length packet in the input queue into said standby buffer corresponding to the destination output line, and when the address memory associated with the standby buffer enters an idle state, said second controller sets a pair of write addresses obtained from said standby buffer into said address memory.

16. A packet switch for transferring variable length packets received a plurality of input lines to at least one of output lines on a fixed length data block unit basis, comprising:

a shared buffer memory commonly used by said plurality of input lines;

multiplexing means for multiplexing received packets from said input lines on the fixed length data block unit basis and for supplying the fixed length data blocks to said shared buffer memory;

buffer control means for controlling writing and reading out of each of said fixed length data blocks to and from said shared buffer memory, wherein said buffer control means comprises:

first control means for forming a plurality of input queues corresponding to variable length packets by linking write addresses of fixed length data blocks stored in said shared buffer memory, and for linking an input queue, of which the last fixed length data block of a variable length packet is already written to said shared buffer memory, to an output queue corresponding to a destination output line of the variable length packet, and second control means for accessing a plurality of output queues, each of which corresponds to one of said output lines, in accordance with a predetermined order and for reading out fixed length data blocks from said shared buffer memory based on the linked addresses associated with said output queues, and wherein said first control means having means for registering an input queue, of which a last fixed length data block is already written, into a plurality of output queues; and address release control means for counting the number of reading times of a fixed length data block stored in said shared buffer memory and releasing the next read address when the number of reading times reaches a designated value.

* * * * *